United States Patent [19]

Boller et al.

[11] Patent Number: 5,013,476

[45] Date of Patent: May 7, 1991

[54] LIQUID CRYSTAL COMPOUNDS AND INDICATING DEVICE EMPLOYING SAME

[75] Inventors: Arthur Boller, Binningen; Richard Buchecker, Zurich, both of Switzerland; Hans-Jürgen Fromm, Tokyo, Japan; Stephen Kelly, Möhlin, Switzerland; Martin Schadt, Seltisberg, Switzerland; Alois Villiger, Basel, Switzerland

[73] Assignee: Hoffmann-La Roche Inc., Nutley, N.J.

[21] Appl. No.: 121,712

[22] Filed: Nov. 17, 1987

[30] Foreign Application Priority Data

Nov. 20, 1986 [CH] Switzerland .................. 4649/86
Sep. 10, 1987 [CH] Switzerland .................. 3505/87

[51] Int. Cl.$^5$ .................... C09K 19/34; C09K 19/32; C09K 19/12; G02F 1/13
[52] U.S. Cl. .......................... 252/299.61; 252/299.01; 252/299.62; 252/299.63; 252/299.64; 252/299.65; 252/299.66; 350/350 S; 560/64; 560/65; 560/73
[58] Field of Search .......... 252/299.01, 299.6, 299.61, 252/299.63, 299.64, 299.65, 299.66, 299.67, 299.68; 350/350 S

[56] References Cited

U.S. PATENT DOCUMENTS

| | | |
|---|---|---|
| 4,200,580 | 4/1980 | Hsu .................. 252/299.61 |
| 4,311,610 | 1/1982 | Zaschke et al. .......... 252/299.61 |
| 4,325,830 | 4/1982 | Sethofer .................. 252/299.61 |
| 4,356,104 | 10/1982 | Hsu .................. 252/299.61 |
| 4,462,923 | 7/1984 | Boller et al. .......... 252/299.61 |
| 4,565,425 | 1/1986 | Petrzilka et al. .......... 252/299.61 |
| 4,621,901 | 11/1986 | Petrzilka et al. .......... 252/299.61 |
| 4,654,421 | 3/1987 | Tanaka et al. .......... 252/299.61 |
| 4,676,604 | 6/1987 | Petrzilka et al. .......... 252/299.61 |
| 4,704,227 | 11/1987 | Krause et al. .......... 252/299.61 |
| 4,719,032 | 1/1988 | Wächtler et al. .......... 252/299.63 |
| 4,725,688 | 2/1988 | Taguchi et al. .......... 252/299.61 |
| 4,726,911 | 2/1988 | Krause et al. .......... 252/299.61 |
| 4,770,503 | 9/1988 | Buchecker et al. .......... 252/299.61 |
| 4,775,223 | 10/1988 | Yoshinaga et al. .......... 252/299.01 |
| 4,776,973 | 10/1988 | Bofinger et al. .......... 252/299.61 |
| 4,784,793 | 11/1988 | Coates et al. .......... 252/299.01 |
| 4,812,259 | 3/1989 | Yoshinaga et al. .......... 252/299.65 |

FOREIGN PATENT DOCUMENTS

| | | |
|---|---|---|
| 25119 | 3/1981 | European Pat. Off. ....... 252/299.61 |
| 104011 | 3/1984 | European Pat. Off. ....... 252/299.61 |
| 169327 | 1/1986 | European Pat. Off. ....... 252/299.61 |
| 175591 | 3/1986 | European Pat. Off. ....... 252/299.61 |
| 188222 | 7/1986 | European Pat. Off. ....... 252/299.01 |
| 206228 | 12/1986 | European Pat. Off. ....... 252/299.61 |
| 225195 | 6/1987 | European Pat. Off. ....... 252/299.61 |
| 248335 | 12/1987 | European Pat. Off. ....... 252/299.61 |
| 284008 | 9/1988 | European Pat. Off. ....... 252/299.61 |
| 3405914 | 8/1985 | Fed. Rep. of Germany .................. 252/299.61 |
| 3500909 | 7/1986 | Fed. Rep. of Germany .................. 252/299.61 |
| 3515373 | 11/1986 | Fed. Rep. of Germany .................. 252/299.61 |
| 3515374 | 11/1986 | Fed. Rep. of Germany .................. 252/299.61 |
| 3518734 | 11/1986 | Fed. Rep. of Germany .................. 252/299.61 |

(List continued on next page.)

OTHER PUBLICATIONS

Haramoto et al., "New Ferroelectric Liquid Crystals", Chem. Let. pp. 755-758 (1987).

Primary Examiner—Richard D. Lovering
Assistant Examiner—Cynthia Harris
Attorney, Agent, or Firm—George M. Gould; Bernard S. Leon; George W. Johnston

[57] ABSTRACT

A ferroelectric liquid crystal mixture containing at least one compound of the formula

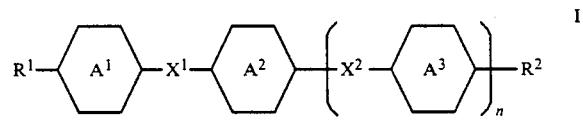

wherein
n stands for the number 0 or 1; $X^1$ represents a single covalent bond, —COO— or —OOC— and $X^2$ represents a single covalent bond, —COO—, —OOC—, —CH$_2$CH$_2$—, —OCH$_2$— or —CH$_2$O—; rings $A^1$, $A^2$ and $A^3$ each independently signify 1,4-phenylene optionally substituted with cyano, halogen or lower alkyl or pyrimidin-2,5-diyl, pyrazin-2,5-diyl, when n is 1, trans-1,4-cyclohexylene or trans-m-dioxan-2,5-diyl; with the proviso that one of the rings present stands for pyrimidin-2,5-diyl or pyrazin-2,5-diyl when a further ring signifies trans-1,4-cyclohexylene or when n stands for the number 0 and $X^1$ stands for a single covalent bond; and $R^1$ signifies an optionally halogen-substituted alkenyl group with up to 18 carbon atoms in which optionally 1 or 2 non-adjacent CH$_2$ groups are replaced by —O— and/or a C=C double bond; with the proviso that $R^1$ is different from 3,7-dimethyl-6-octenyloxy; $R^2$ signifies an optionally halogen-substituted alkyl group with up to 18 carbon atoms in which optionally 1 or 2 non-adjacent CH$_2$ groups are replaced by —O— and/or a C=C double bond; with the proviso that residues $R^1$ and/or $R^2$ attached to an aromatic ring have at least 2 chain atoms between the aromatic ring and a C=C double bond present;

as well as novel compounds falling under formula I and novel ferroelectric liquid crystal devices employing the compounds according to the invention.

9 Claims, No Drawings

FOREIGN PATENT DOCUMENTS

| | | | |
|---|---|---|---|
| 3627964 | 3/1987 | Fed. Rep. of Germany | 252/299.61 |
| 3706766 | 9/1987 | Fed. Rep. of Germany | 252/299.61 |
| 61-87775 | 5/1986 | Japan | 252/299.61 |
| 61-227547 | 10/1986 | Japan | 252/299.63 |
| 63-253074 | 10/1988 | Japan | 252/299.61 |
| 86/00087 | 3/1986 | PCT Int'l Appl. | 252/299.61 |
| 2041354 | 10/1980 | United Kingdom | 252/299.61 |
| 8604060 | 7/1986 | World Int. Prop. O. | 252/299.61 |
| 8604328 | 7/1986 | World Int. Prop. O. | 252/299.61 |
| 86-7055 | 12/1986 | World Int. Prop. O. | 252/299.61 |
| 8607055 | 12/1986 | World Int. Prop. O. | 252/299.61 |
| 8701701 | 3/1987 | World Int. Prop. O. | 252/299.61 |
| 8701717 | 3/1987 | World Int. Prop. O. | 252/299.63 |
| 8705013 | 8/1987 | World Int. Prop. O. | 252/299.63 |
| 8705015 | 8/1987 | World Int. Prop. O. | 252/299.61 |
| 8705017 | 8/1987 | World Int. Prop. O. | 252/299.61 |
| 8705018 | 8/1987 | World Int. Prop. O. | 252/299.61 |

LIQUID CRYSTAL COMPOUNDS AND INDICATING DEVICE EMPLOYING SAME

FIELD OF THE INVENTION

The present invention is concerned with novel liquid crystalline mixtures with ferroelectric properties, their use for electro-optical purposes and novel compounds for these mixtures.

BACKGROUND OF THE INVENTION

Liquid crystals are used primarily as dielectrics in indicating devices, as the optical properties of such substances can be influenced by an applied voltage. Electro-optical devices based on liquid crystals are well-known to the person skilled in the art and can be based on various effects such as, for example, dynamic scattering, the deformation of aligned phases (DAP cells), the Schadt-Helfrich effect (TN cells twisted-nematic and STN cells [super twisted-nematic]), the guest/host effect (guest/host cells), a cholesteric-nematic phase transition (phase-change cells) or the SBE effect (super birefringence effect). The response times of such indicating devices generally lie in the order of several milliseconds or more.

It has recently been found that the speed of response can be significantly improved by using indicating devices based on liquid crystals with ferroelectric properties. In this case there can be used basically various chiral smectic liquid crystals with ferroelectric properties such as, for example, liquid crystals with smectic C, F or I phases However, liquid crystals with chiral smectic C phases have been found to be particularly suitable.

Hitherto, comparatively few liquid crystals with ferroelectric properties have become known. Moreover, the known liquid crystals frequently have an inadequate chemical and thermal stability and have only relatively narrow chiral smectic phases or chiral smectic phases lying at elevated temperatures. There accordingly exists a great need for further suitable materials, especially having regard to the further improvement of ferroelectric liquid crystal mixtures.

SUMMARY OF THE INVENTION

The present invention provides a liquid crystalline mixture with ferroelectric properties containing at least two components, wherein at least one component is a compound of the formula

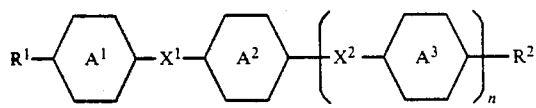

I wherein
n stands for the number 0 or 1; $X^1$ represents a single covalent bond, —COO— or —OOC— and $X^2$ represents a single covalent bond, —COO—, —OOC—, —CH$_2$CH$_2$—, —OCH$_2$— or —CH$_2$O—; rings $A^1$, $A^2$ and $A^3$ each independently signify unsubstituted 1,4-phenylene or 1,4-phenylene substituted with cyano, halogen or lower alkyl or one of the rings also signifies pyrimidin-2,5-diyl or pyrazin-2,5-diyl and/or, when n stands for the number 1, one of the rings also signifies trans-1,4-cyclohexylene or trans-m-dioxan-2,5-diyl; with the proviso that one of the rings present stands for pyrimidin-2,5-diyl or pyrazin-2,5- diyl when a further ring signifies trans-1,4-cyclohexylene or when n stands for the number 0 and $X^1$ stands for a single covalent bond: $R^1$ signifies an optionally halogen-substituted alkenyl group with up to 18 carbon atoms in which optionally one CH$_2$ group or two non-adjacent CH$_2$ groups is/are replaced by —O— and/or a C—C single bond is optionally replaced by a C=C double bond; with the proviso that $R^1$ is different from 3,7-dimethyl-6-octenyloxy (citronellol ether); $R^2$ signifies an optionally halogen-substituted alkyl group with up to 18 carbon atoms in which optionally one CH$_2$ group or two non-adjacent CH$_2$ groups is/are replaced by —O— and/or a C—C single bond is optionally replaced by a C=C double bond; with the proviso that residues $R^1$ and/or $R^2$ attached to an aromatic ring have at least two chain atoms between the aromatic ring and a C=C double bond present.

A preferred aspect of the invention is concerned with the use of liquid crystalline mixtures according to the invention in ferroelectric electro-optical indicating devices. Preferred compounds of formula I which are used are the optically active compounds of formula I in which at least one of the residues $R^1$ and $R^2$ has a chiral carbon atom. Further preferred compounds of formula I which are used are those which have in $R^1$ and $R^2$ together where n=1 at least 8, especially at least 10 and particularly at least 12, chain atoms and where n=0 at least 10, especially at least 12 and particularly at least 14, chain atoms (i.e. carbon and optional oxygen atoms) in an unbranched chain. Ferroelectric electro-optical indicating devices having fast switching times can be made using liquid crystal mixtures according to the invention sandwiched between two transparent plates having polarizers and electrode means.

DESCRIPTION OF THE PREFERRED EMBODIMENT

It has been found that the presence of one or more double bonds optionally in combination with one or more chiral carbon atoms in the side-chains of the compounds of formula I above enhances the ferroelectric properties and especially the formation of chiral smectic C phases. Liquid crystalline phases lying above the chiral smectic phase are frequently largely suppressed by the presence of a double bond. Further, in general the melting points are lowered and highly ordered smectic phases are largely suppressed. The compounds of formula I with long side-chains $R^1$ and $R^2$ therefore generally have comparatively broad chiral smectic C phases. The compounds with short side-chains $R^1$ and $R^2$ have to some extent only monotropic or virtual phases, but likewise enhance the formation of chiral smectic C phases when used in mixtures.

This finding contradicts the previous use of alkenyl substituents in achiral compounds which, depending on the position and configuration of the double bond, generally leads to a deterioration of the liquid crystalline properties or to an intensification of the nematic tendencies.

The compounds of formula I have a good chemical and thermal stability and a low viscosity. They have a good miscibility with one another and with known liquid crystals, especially with known ferroelectric liquid crystals.

The term "halogen" signifies in the scope of the present invention fluorine, chlorine, bromine or iodine The term "lower alkyl" signifies alkyl groups with 1-5 carbon atoms such as methyl, ethyl, propyl, isopropyl and the like. The term "aromatic ring" embraces substituted or unsubstituted 1,4-phenylene, pyrimidin-2,5-diyl and pyrazin-2,5-diyl.

The term "chain atoms" denotes in the scope of the present invention the carbon and oxygen atoms present in an unbranched chain in $R^1$ or $R^2$, i.e. in the case of branched chains substituents are discounted. Particulars relating to the position of the double bond relate to the chain containing the double bond. Particulars relating to the chain length of $R^1$ or $R^2$ relate to the longest unbranched chain. A group —O— present in the chain therefore counts as 1 chain atom. For example, 5-octenyloxy contains 9 chain atoms and the double bond is separated from the ring by 5 chain atoms. 5-Methylheptyl 4-methylhexyloxy and 5-methoxyhexyl, for example, each have 7 chain atoms in the longest unbranched chain.

The 1,4-phenylene groups present in formula I are preferably unsubstituted. If desired, however, the transition temperatures, the solubility, the dielectric anisotropy and the like can be modified by using substituted 1,4-phenylene groups such as 2-methyl-1,4-phenylene, 2-fluoro-1,4-phenylene, 2-cyano-1,4-phenylene and 2,3-dicyano-1 4-phenylene.

In formula I above $X^2$ preferably stands for a single covalent bond, —COO— or —OOC—. Especially preferred compounds of formula I are those in which one of the groups $X^1$ and $X^2$ signifies a single covalent bond and the other signifies a single covalent bond —COO— or —OOC—.

A trans-1,4-cyclohexylene group optionally present in formula I is preferably not attached to the oxygen atom of an ester group —COO— or —OOC—. Preferred cyclohexane derivatives are, in general, the cyclohexanecarboxylic acid esters, i.e. those compounds of formula I in which an optionally present trans-1,4-cyclohexylene group is linked with the carbon atom of an ester group —COO— or —OOC—.

Examples of particularly preferred groups of compounds of formula I are the compounds of the formulae

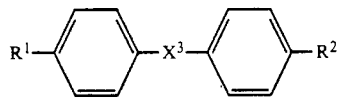

II

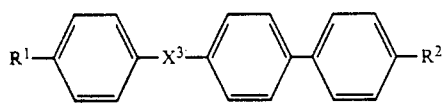

III

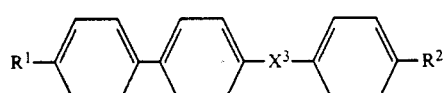

IV

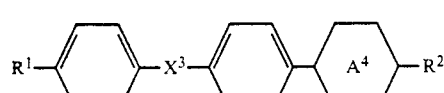

V

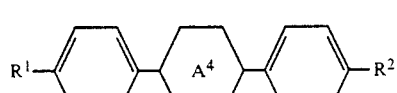

VI

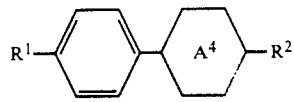

VII

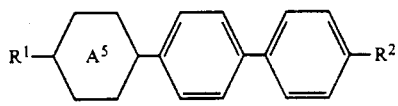

VIIIa

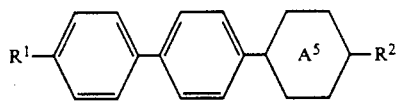

VIIIb

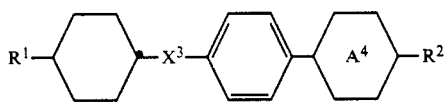

XII

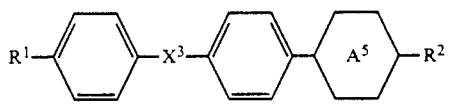

XIII

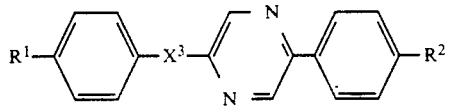

XIV wherein $X^3$ denotes —COO— or —OOC—, ring $A^4$ represents pyrimidin-2,5-diyl, ring $A^5$ represents trans-m-dioxan-2,5-diyl and $R^1$ and $R^2$ have the above significances.

Preferably, the pyrimidine ring in formulae V, VII and XII and the m-dioxane ring in formulae VIII and XIII are linked in position Z with the benzene ring.

The straight-chain and branched alkenyl and alkenyloxy groups, especially those which have at least 2, preferably at least 4, chain atoms between the double bond and ring $A^1$, have been found to be especially suitable residues $R^1$. The non-chiral, preferably straight-chain, residues are generally preferred. Examples of especially preferred residues $R^1$ are the following groups which apart from those with terminal double bond, can each be present in the E or Z form: 4-alkenyloxy such as 4-pentenyloxy, 4-hexenyloxy, 4-heptenyloxy, 4-octenyloxy, 4-nonenyloxy, 4-decenyloxy, 4-undecenyloxy and 4-dodecenyloxy; 5-alkenyl such as 5-hexenyl, 5-heptenyl, 5-octenyl, 5-nonenyl, 5-decenyl, 5-undecenyl and 5-dodecenyl; 5-alkenyloxy such as 5-hexenyloxy, 5-heptenyloxy, 5-octenyloxy, 5-nonenyloxy, 5-decenyloxy, 5-undecenyloxy and 5-dodecenyloxy; 6-alkenyl such as 6-heptenyl, 6-octenyl, 6-nonenyl, 6-decenyl, 6-undecenyl and 6-dodecenyl; 6-alkenyloxy such as 6-heptenyloxy, 6-octenyloxy, 6-nonenyloxy, 6-decenyloxy, 6-undecenyloxy and 6-dodecenyloxy; 7-alkenyl such as 7-octenyl 7-nonenyl, 7-decenyl, 7-undecenyl and 7-dodecenyl; 7-alkenyloxy such as 7-octenyloxy, 7-nonenyloxy, 7-decenyloxy, 7-undecenyloxy and 7-dodecenyloxy; 8-alkenyl such as 8-nonenyl, 8-decenyl, 8-undecenyl and 8-dodecenyl; 8-alkenyloxy such as 8-nonenyloxy, 8-decenyloxy, 8-undecenyloxy and 8-dodecenyloxy; 9-alkenyl such as 9-decenyl, 9-undecenyl and 9-dodecenyl; 9-alkenyloxy such as 9-decenyloxy, 9-undecenyloxy and 9-dodecenyloxy; 10-alkenyl such as 10-undecenyl and 10-dodecenyl; 10-alkenyloxy such as 10-undecenyloxy and 10-dodecenyloxy and the like. Especially preferred groups $R^1$ are those with 5 or more chain atoms between the double bond and ring $A^1$ as well as those with a terminal double bond.

The ferroelectric properties are, however, enhanced not only by the aforementioned residues $R^1$, but also generally by groups derived from alkenyl in which one or more hydrogen atoms is/are replaced by halogen and/or one $CH_2$ group or two non-adjacent $CH_2$ groups is/are replaced by —O—. If desired, $R^1$ can also have a further C=C double bond and/or a chiral carbon atom. However, for the found effect it is essential that $R^1$ has at least a one C=C double bond.

$R^1$ conveniently has a maximum of 18 carbon atoms, preferably about 4–15 and particularly about 6–12 carbon atoms. The double bond is generally separated from ring $A^1$ by at least 2, preferably by at least 4 and particularly by at least 5, chain atoms.

$R^2$ can be straight-chain or branched, chiral or achiral. $R^2$ embraces usual non-polar or weakly polar groups, namely alkyl or alkenyl groups as well as groups derived therefrom in which one or more hydrogen atoms is/are replaced by halogen and/or one $CH_2$ group or two non-adjacent $CH_2$ groups is/are replaced by —O—.

Especially preferred residues $R^2$ are alkyl and alkoxy groups such as pentyl, hexyl, heptyl, octyl, nonyl, decyl, undecyl, butyloxy, pentyloxy, hexyloxy, heptyloxy, octyloxy, nonyloxy, decyloxy, undecyloxy and the like in the case of straight-chain achiral groups and the readily accessible methylalkyl and methylalkoxy groups such as 2-methylbutyl, 3-methylpentyl, 4-methylhexyl, 5-methylheptyl, 6-methyloctyl, 7-methylnonyl, 2-methylbutyloxy, 3-methylpentyloxy, 4-methylhexyloxy, 5-methylheptyloxy, 6-methyloctyloxy, 1-methylheptyloxy and the like in the case of branched-chain, chiral groups.

$R^2$ conveniently has a maximum of 18 carbon atoms, preferably 4–15 and particularly about 5–12 carbon atoms. A C=C double bond optionally present in $R^2$ is preferably separated from the ring ($A^2$ in the case of n=0 or $A^3$ in the case of n=1) by at least 2, particularly by at least 4, chain atoms.

In accordance with a preferred aspect at least one of the residues $R^1$ and $R^2$ has a chiral carbon atom. Preferred groups $R^1$ or $R^2$ with chiral carbon atoms are the groups of the formulae

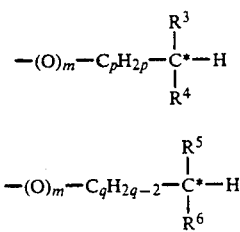

wherein
m, p and q signify whole numbers and m stands for 0 or 1. p stands for 0–6 and q stands for 2–6; $R^3$ signifies alkyl and $R^4$ signifies halogen, alkoxy, alkenyl, alkenyloxy or alkyl different from $R^3$; or $R^3$ signifies alkenyl and $R^4$ signifies alkoxy; $R^5$ denotes alkyl and $R^6$ denotes halogen, alkoxy or alkyl different from $R^5$; and C* signifies the chiral carbon atom;
whereby as chiral residues $R^1$ there come into consideration only those groups which have a C=C double bond.

The groups of formula IX in which $R^3$ signifies methyl and $R^4$ signifies alkyl different from methyl, preferably ethyl, are especially preferred chiral residues $R^2$.

Of the optically active compounds of formulae I–VIII and XII–XIV there are generally preferred those in which $R^2$ has a chiral carbon atom and preferably a group of formula IX or X.

Those compounds of formulae I–VIII and XII–XIV in which in each case $R^1$ signifies a non-chiral, preferably straight-chain, group and $R^2$ optionally has a chiral carbon atom are especially preferred. Accordingly, those compounds of formulae I–VIII and XII–XIV in which in each case $R^1$ denotes a non-chiral, preferably straight-chain, alkenyl or alkenyloxy group (especially one of the preferred alkenyl or alkenyloxy groups named above) and $R^2$ signifies a straight-chain or branched alkyl or alkoxy group (such as n-alkyl, n-alkoxy, methylalkyl or methylalkoxy) are particularly preferred.

Preferred compounds of formula II are those in which $R^1$ signifies alkenyloxy and $R^2$ signifies alkoxy, especially those in which $R^1$ signifies straight-chain alkenyloxy and $R^2$ signifies straight-chain or branched alkoxy.

Preferred compounds of formula III are those in which $R^1$ signifies alkenyloxy (preferably straight-chain alkenyloxy) and $R^2$ signifies straight-chain or branched alkyl or alkoxy, especially those in which $R^2$ signifies straight-chain or branched alkyl and $X^3$ signifies —OOC—.

Preferred compounds of formula IV are those in which $R^1$ signifies alkenyloxy (preferably straight-chain alkenyloxy) and $R^2$ signifies straight-chain or branched alkoxy. $X^3$ preferably stands for —COO—.

Preferred compounds of formula V are those in which $R^1$ signifies alkenyloxy (preferably straight-chain alkenyloxy) and $R^2$ signifies straight-chain or branched alkyl. $X^3$ preferably stands for —COO—. The pyrimidine ring $A^4$ is preferably linked in position 2 with the benzene ring.

Preferred compounds of formula VI are those in which $R^1$ signifies alkenyloxy (preferably straight-chain alkenyloxy) and $R^2$ signifies straight-chain or branched alkyl The pyrimidine ring is preferably linked in position 2 with the group p-$R^1$-phenyl Preferred compounds of formula VII are those in which $R^1$ signifies alkenyloxy (preferably straight-chain alkenyloxy) and $R^2$ signifies straight-chain or branched alkyl. The pyrimidine ring $A^4$ is preferably linked in position 2 with the benzene ring.

Preferred compounds of formula VIIIa are those in which $R^1$ signifies alkenyl (preferably straight-chain alkenyl) and $R^2$ signifies straight-chain or branched alkoxy. Preferred compounds of formula VIIIb are those in which $R^1$ signifies alkenyloxy (preferably straight-chain alkenyloxy) and $R^2$ signifies straight-chain or branched alkyl. The dioXane ring $A^5$ in formulae VIIIa and VIIIb is preferably linked in position 2 with the biphenyl group.

Preferred compounds of formula XII are those in which $R^1$ signifies alkenyl (preferably straight-chain alkenyl) and $R^2$ signifies straight-chain or branched alkyl. The pyrimidine ring $A^4$ is preferably linked in position 2 with the benzene ring. In formula XII $X^3$ preferably stands for —COO—.

Preferred compounds of formula XIII are those in which $R^1$ signifies alkenyloxy (preferably straight-chain alkenyloxy) and $R^2$ signifies straight-chain or branched alkyl. The dioxane ring $A^5$ is preferably linked in position 2 with the benzene ring. In formula XIII $X^3$ preferably stands for —COO—.

Preferred compounds of formula XIV are those in which $R^1$ signifies alkenyl or alkenyloxy (preferably straight-chain alkenyl or alkenyloxy) and $R^2$ signifies straight-chain or branched alkyl or alkoxy. Preferably, $X^3$ in formula XIV stands for —COO—.

Further, the group $R^1$ in formulae II–VIII and XII–XIV preferably has at least 2 chain atoms, particularly at least 4 chain atoms, between the double bond and the ring to which it is attached.

The compounds of formula I with short residues $R^1$ and $R^2$ often have only monotropic or virtual liquid crystal properties, but they are also suitable for improving the properties of ferroelectric mixtures. The compounds of formula I with long residues $R^1$ and $R^2$ for the most part have relatively broad chiral smectic C phases.

The invention is also concerned with the novel compounds of formula I in which at least one of the residues $R^1$ and $R^2$ has a chiral carbon atom and/or one of rings $A^1$, $A^2$ and $A^3$ signifies pyrazin-2,5-diyl and/or $R^1$ has at least 4 chain atoms (i.e. saturated carbon atoms or oxygen atoms) between the double bond and ring $A^1$. Preferably, the number of chain atoms in the longest unbranched chains in $R^1$ and $R^2$ together amounts to at least 8 when n stands for the number 1 and to at least 10 when n stands for the number 0. More preferably, the number of chain atoms in unbranched chains in $R^1$ and $R^2$ together amounts to at least 10, especially to at least 12, when n stands for the number 1 and to at least 12, especially to at least 14, when n stands for the number 0. Preferably, ring $A^2$ stands for pyrazin-2,5-diyl when n signifies the number 1, ring $A^1$ signifies optionally substituted 1,4-phenylene and ring $A^3$ signifies trans-1,4-cyclohexylene.

Preferred compounds in accordance with the invention are, further, the compounds in accordance with the preferred aspects mentioned above which have the given number of chain atoms in $R^1$ and $R^2$. Examples of especially preferred compounds of formula I are the corresponding compounds of formulae II–VIII and XII–XIV as well as the compounds named in the Synthesis Examples below.

The compounds of formula I can be manufactured in a manner known per se, for example according to the methods illustrated in the Synthesis Examples. The introduction of chiral residues and alkenyl substituents can be effected, for example, according to the usual methods described for cholesteric or nematic substances.

The manufacture of the liquid crystalline mixtures in accordance with the invention and their use in electrooptical devices can also be effected in a manner known per se.

The compounds of formula I can be mixed with one another and/or with usual liquid crystal materials such as are already known in the art. They are primarily suitable for the manufacture of ferroelectric mixtures, i.e. of mixtures having a chiral smectic phase, especially of mixtures having a smectic C phase.

The liquid crystalline mixtures with ferroelectric properties in accordance with the invention contain at least 2 components, of which at least one component is a compound of formula I. The amount of compounds of formula I in the mixtures in accordance with the invention can vary in wide limits and can amount, for example, from about 1–100 wt. %. In general, the amount of compounds of formula I preferably amounts to about 10–70 wt. % and particularly about 20–50 wt. %.

The mixtures in accordance with the invention can contain, in addition to one or more compounds of formula I, usual components for chiral smectic mixtures. They preferably contain, in addition to one or more compounds of formula I, one or more compounds of the formulae

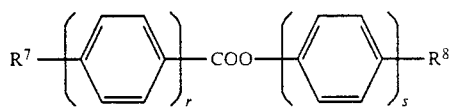

XI

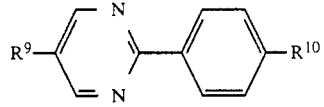

XV

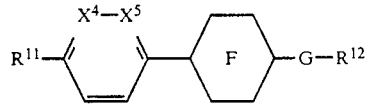

XVI

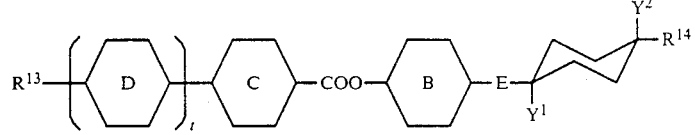

XVII wherein $R^7$ and $R^8$ signify alkyl, alkoxy, alkanoyl, alkanoyloxy, alkoxycarbonyl or alkoxycarbonyloxy with up to 18 carbon atoms; r and s denote the numbers 1 or 2; $R^9$ and $R^{10}$ represent alkyl or alkoxy with 1–18 carbon atoms; $X^4$ stands for CH and $X^5$ stands for N or $X^4$ stands for N and $X^5$ stands for CH; G signifies a single covalent bond, trans-1,4-cyclohexylene cis-4-cyano-trans-1,4-cyclohexylene or 1,4-phenylene optionally substituted with halogen or methyl; ring F represents trans-1,4-cyclohexylene, 1,4-phenylene optionally substituted with halogen or methyl or, when G signifies a single covalent bond, also cis-4-cyano-trans-1,4-cyclohexylene; $R^{11}$ and $R^{12}$ each denote an optionally halogen-substituted alkyl or alkenyl group in which optionally one $CH_2$ group or two non-adjacent $CH_2$ groups is/are replaced by —O—, —COO— and/or —OOC—; t stands for the number 0 or 1: E signifies a single covalent bond —$CH_2CH_2$—, —$OCH_2$—, —COO— or —OOC—; rings B, C and D denote 1,4-phenylene optionally substituted with cyano, halogen or lower alkyl; $Y^1$ and $Y^2$ signify hydrogen or one of the substituents $Y^1$ and $Y^2$ also signifies cyano; and $R^{13}$ and $R^{14}$ represent optionally halogen-substituted $C_1$-$C_{18}$-alkyl or optionally halogen-substituted $C_2$-$C_{18}$-alkenyl in which optionally one $CH_2$ group or two non-adjacent $CH_2$ groups is/are replaced by oxygen.

The smectic mixtures in accordance with the invention can basically consist of optically inactive compounds. However, they preferably contain one or more optically active compounds in order to produce a spontaneous polarization, i.e. they preferably contain at least one optically active compound of formula I having a chiral carbon atom in $R^1$ and/or $R^2$ and/or at least one optically active additive. Preferred chiral smectic mixtures with at least 2 components are accordingly those in which at least one component is an optically active compound of formula I and a second component can be optically active or optically inactive, as well as those in which at least one component is an optically inactive, preferably achiral, compound of formula I and a second component is optically active. The second component is preferably a further compound of formula I or a compound of formula XI, XV, XVI or XVII.

The invention is illustrated in more detail by the following Examples. Unless otherwise indicated, all Examples were carried out as written. The enantiomers of the named compounds have in each case the same phase transition temperatures and a twisting of the same magnitude, but of opposite sign. The abbreviations used for the characterization of the phase transitions have the following significances which will be understood by those having ordinary skill in the art:

| | |
|---|---|
| C | stands for crystalline |
| S | stands for smectic |
| $S_A$ | stands for smectic A |
| $S_B$ | stands for smectic B |
| $C_C$ | stands for smectic C (achiral compound or racemate) |
| $S_C*$ | stands for chiral smectic C |
| N | stands for nematic |
| Ch | stands for cholesteric |
| I | stands for isotropic. |

EXAMPLE 1

A mixture of 0.3 g of 4-(9-decenyloxy)benzoic acid, 0.23 g of (S)-4-(4-methylhexyloxy)phenol, 0.27 g of N,N'-dicyclohexylcarbodiimide, 0.04 g of 4-(dimethylamino)pyridine and 50 ml of absolute dichloromethane was stirred at room temperature overnight. The mixture was subsequently filtered and concentrated. The crude product obtained was purified by chromatography on silica gel with toluene. The (S)-4-(9-decenyloxy)benzoic acid 4-(4-methylhexyloxy)phenyl ester was recrystallized from methanol; m.p. (C-$S_C*$) 28.5° C., phase transition ($S_C*$-$S_A$) 54° C., cl.p. ($S_A$-I) 65° C.

The 4-(9-decenyloxy)benzoic acid used as the starting material was prepared as follows:

(a) A solution of 20 g of 9-decen-1-ol in 50 ml of absolute pyridine was treated portionwise at 0° C. and while gassing with argon with 25.6 g of p-tosyl chloride. After stirring at 0° C. for 8 hours (formation of a white precipitate) the reaction mixture was treated with 50 ml of water, cautiously made acid with 100 ml of 2N hydrochloric acid and extracted three times with 30 ml of diethyl ether each time. The combined organic phases were washed with 500 ml of water, 100 ml of concentrated potassium carbonate solution and 500 ml of water, dried over magnesium sulphate and concentrated. The crude 9-decen-1-yl p-tosylate (36 g) was used without additional purification.

(b) A mixture of 18 g of 9-decen-1-yl p-tosylate. 17.7 g of methyl 4-hydroxybenzoate, 3.6 g of potassium hydroxide, 75 ml of ethanol and 1 ml of water was heated under reflux overnight. The cooled reaction mixture was subsequently poured into ice-water and extracted three times with 50 ml of diethyl ether each time. The organic phases were washed with 500 ml of water, dried over magnesium sulphate and concentrated. Chromatography of the residue on silica gel with toluene gave 17 g of methyl 4-(9-decenyloxy)benzoate which was used without additional purification.

(c) A mixture of 17 g of methyl 4-(9-decenyloxy)benzoate. 17 g of potassium hydroxide, 20 ml of water and 200 ml of methanol was heated to 75° C. on an oil bath for 4 hours. The cooled mixture was treated with 100 ml of ice-cold 3N hydrochloric acid and the liberated acid was taken up in 150 ml of diethyl ether. The separated aqueous phase was back-extracted twice with 100 ml of diethyl ether each time. The combined organic phases were washed with 50 ml of 2N sodium carbonate solution and several times with water, dried over magnesium sulphate and concentrated. Recrystallization of the crude product obtained from ethanol gave 7 g of 4-(9-decenyloxy)benzoic acid, m.p. (C-$S_C$) 77° C., phase transition ($S_C$-N) 116° C., cl.p. (N-I) 137° C.

The following compounds were manufactured in an analogous manner:

(S)-4-(5-hexenyloxy)benzoic acid 4-(2-methylbutyloxy)phenyl ester, m.p. (C-Ch) 61.5° C., cl.p. (Ch-I) 40° C.;

(S)-4-(6-heptenyloxy)benzoic acid 4-(2-methylbutyloxy)phenyl ester, m.p. (C-I) 56° C., cl.p ($S_A$-I) 54.5° C.;

(S)-4-(7-octenyloxy)benzoic acid 4-(2-methylbutyloxy)phenyl ester, m.p. (C-I) 43.5° C., phase transition ($S_C*$-$S_A$) 26° C., cl.p. ($S_A$-I) 49° C.;

(S)-4-(9-decenyloxy)benzoic acid 4-(2-methylbutyloxy)phenyl ester, cl.p. (C-$S_A$) 39° C., phase transition ($S_C*$-$S_A$) 36° C., cl.p. ($S_A$-I) 55° C.;

(S)-4-(10-undecenyloxy)benzoic acid 4-(2-methylbutyloxy)phenyl ester, m.p. 48° C., phase transition ($S_C*$-$S_A$) 33° C., cl.p. ($S_A$-I) 59.5° C.;

(S)-4-(5-hexenyloxy)benzoic acid 4-(4-methylhexyloxy)phenyl ester, m.p. (C-I) 62.5° C., cl.p. (Ch-I) 58° C.;

(S)-4-(7-octenyloxy)benzoic acid 4-(4-methylhexyloxy)phenyl ester; m.p. (C-Ch) 47.5° C., phase transition ($S_C*$-$S_A$) 44° C., phase transition ($S_A$-Ch) 60.5° C. cl.p. (Ch-I) 63° C.;

(S)-4-(10-undecenyloxy)benzoic acid 4-(4-methylhexyloxy)phenyl ester; m.p. C-$S_C*$ 39.5° C., phase transition ($S_B$-$S_C*$) 31° C., phase transition ($S_C$-$S_A$) 55.5° C., cl.p. ($S_A$-I) 70° C.;

(S)-4-(5Z-octenyloxy)benzoic acid 4-(4-methylhexyloxy)phenyl ester; m.p. (C-I) 61° C., phase transition (S$_C$*-Ch) 47° C., cl.p. (Ch-I) 50.5° C.;

(S)-4-(5-hexenyloxy)benzoic acid 4-(6-methyloctyloxy)phenyl ester; m.p. (C-S$_C$*) 44.5° C., phase transition (S$_C$*-Ch) 51° C., cl.p. (Ch-I) 64.5° C.;

(S)-4-(6-heptenyloxy)benzoic acid 4-(6-methyloctyloxy)phenyl ester; m.p. (C-S$_A$) 41.5° C., phase transition (S$_C$*-S$_A$) 40° C., phase transition (S$_A$-Ch) 73.5° C., cl.p. (Ch-I) 75° C.;

(S)-4-(7-octenyloxy)benzoic acid 4-(6-methyloctyloxy)phenyl ester; m.p. (C-S$_C$*) 54° C., phase transition (S$_C$*-S$_A$) 55.5° C., phase transition (S$_A$-Ch) 70.5° C., cl.p. (Ch-I) 71° C.;

(S)-4-(9-decenyloxy)benzoic acid 4-(6-methyloctyloxy)phenyl ester; m.p. (C-S$_{C,}$) 63° C., phase transition (S$_B$-S$_C$*) 37° C., phase transition (S$_C$*-S$_A$*) 67° C., cl.p. (S$_A$-I) 74.5° C.;

(S)-4-(10-undecenyloxy)benzoic acid 4-(6-methyloctyloxy)phenyl ester; m.p. (C-S$_C$*) 53° C., phase transition (S$_B$-S$_C$*) 46° C., phase transition (S$_C$*-S$_A$) 68.5° C., cl.p. (S$_A$-I) 78° C.;

(S)-4-(5Z-octenyloxy)benzoic acid 4-(6-methyloctyloxy)phenyl ester; m.p. (C-S$_C$*) 48.5° C., phase transition (S$_C$*-Ch) 55° C., cl.p. (Ch-I) 58° C.;

(S)-4-(5-hexenyloxy)benzoic acid 4-(5-[5-methylheptyl]-2-pyrimidinyl)phenyl ester, m.p. (C-Ch) 67.5° C., phase transition (S$_C$*-Ch) 50.5° C., cl.p. (Ch-I) 142.5° C.;

(S)-4-(6-heptenyloxy)benzoic acid 4-(5-[5-methylheptyl]-2-pyrimidinyl)phenyl ester, m.p. (C-S$_C$*) 43.5° C., phase transition (S$_C$*-Ch) 47.5° C., cl.p. (Ch-I) 148.5° C.;

(S)-4-(7-octenyloxy)benzoic acid 4-(5-[5-methylheptyl]-2-pyrimidinyl)phenyl ester, m.p. (C-S$_C$*) 55.5° C., phase transition (S$_C$*-Ch) 58° C., cl.p. (C-Ch) 140.5° C.;

(S)-4-(9-decenyloxy)benzoic acid 4-(5-[5-methylheptyl]-2-pyrimidinyl)phenyl ester, m.p. (C-S$_C$*) 68° C., phase transition (S$_C$*-Ch) 70.5° C., cl.p. (Ch-I) 135.5° C.;

(S)-4-(10-undecenyloxy)benzoic acid 4-(5-[5-methylheptyl]-2-pyrimidinyl)phenyl ester, m.p. (C-S$_C$*) 60.5° C., phase transition (S$_C$*-Ch) 75° C., cl.p. (Ch-I) 135.5° C.;

(S)-4-(5-hexenyloxy)benzoic acid 4-(5-[6-methyloctyl]-2-pyrimidinyl)phenyl ester, m.p. (C-Ch) 65.5° C., phase transition (S$_C$*-Ch) 43.5° C., cl.p. (Ch-I) 138.5° C.;

(S)-4-(6-heptenyloxy)benzoic acid 4-(5-[6-methyloctyl]-2-pyrimidinyl)phenyl ester, m.p. (C-S$_C$*) 45° C., phase transition (S$_C$*-Ch) 48° C., cl.p. (Ch-I) 144° C.;

(S)-4-(7-octenyloxy)benzoic acid 4-(5-[6-methyloctyl]-2-pyrimidinyl)phenyl ester, m.p. (C-S$_C$*) 50° C., phase transition (S$_C$*-Ch) 60° C., cl.p. (Ch-I) 136.5° C.;

(S)-4-(9-decenyloxy)benzoic acid (4-(5-[6-methyloctyl]-2-pyrimidinyl)phenyl ester, m.p. (C-S$_C$*) 67° C. phase transition (S$_C$*-Ch) 79.5° C., cl.p. (Ch-I) 132° C.;

(S)-4-(10-undecenyloxy)benzoic acid 4-(5-[6-methyloctyl]-2-pyrimidinyl)phenyl ester, m.p. (C-S$_C$*) 61° C., phase transition (S$_C$*-Ch) 79.5° C., cl.p. (Ch-I) 132° C.;

trans-4-(3-butenyl)cyclohexanecarboxylic acid 4-(5-decyl-2-pyrimidinyl)phenyl ester, m.p. (C-S$_C$) 71° C., phase transition (S$_C$-N) 92° C., cl.p. (N-I) 162° C.;

trans-4-(4-pentenyl)cyclohexanecarboxylic acid 4-(5-decyl2-pyrimidinyl)phenyl ester, m.p. (C-S$_C$) 71° C. phase transition (S$_C$-N) 97° C., cl.p. (N-I) 149.5°;

4-(10-undecenyloxy)benzoic acid 4-(trans-5-nonyl-m-dioxan-2-yl)phenyl ester, m.p. (C-S$_C$) 75.7° C., phase transitions (S-S$_C$) 43.5° C., (S$_C$-N) 111° C., cl.p. (N-I) 149° C.;

4-(10-undecenyloxy)benzoic acid 4-(trans-5-decyl-m-dioxan-2-yl)phenyl ester, m.p. (C-S$_C$) 75.5° C., phase transitions (S-S$_C$) 39.5°, (S$_C$-N) 116.5° C., cl.p. (N-I) 147.5° C.;

4-(11-dodecenyloxy)benzoic acid 4-(trans-5-nonyl-m-dioxan-2-yl)phenyl ester, m.p. (C-S$_C$) 78.2° C., phase transitions (S-S$_C$) 44° C., (S$_C$-N) 113.5° C., cl.p. (N-I) 145° C.

4-(11-dodecenyloxy)benzoic acid 4-(trans-5-decyl-m-dioxan-2-yl)phenylester, m.p. (C-S$_C$) 78.2° C., phase transitions (S-S$_C$) 39.5° C., (S$_C$-N) 119° C., cl.p. (N-I) 143° C.;

(S)-4-(4-pentenyl)benzoic acid 5-[4-(6-methyloctyloxy)phenyl]pyrazinyl ester, m.p. (C-S) 52.6° C., phase transitions (S-S$_C$*) 56.5° C., (S$_C$-Ch) 105.8° C., cl.p. (Ch-I) 137.9° C.

The optical antipodes of the optically active compounds and following compounds, including the optical antipodes of the optically active compounds, could be manufactured in an analogous manner:

(S)-4-(8-nonenyloxy)benzoic acid 4-(2-methylbutyloxy)phenyl ester;

(S)-4-(5Z-heptenyloxy)benzoic acid 4-(2-methylbutyloxy)phenyl ester;

(S)-4-(5Z-octenyloxy)benzoic acid 4-(2-methylbutyloxy)phenyl ester;

(S)-4-(5Z-nonenyloxy)benzoic acid 4-(2-methylbutyloxy)phenyl ester;

(S)-4-(5Z-decenyloxy)benzoic acid 4-(2-methylbutyloxy)phenyl ester;

(S)-4-(5Z-undecenyloxy)benzoic acid 4-(2-methylbutyloxy)phenyl ester;

(S)-4-(6-heptenyloxy)benzoic acid 4-(4-methylhexyloxy)phenyl ester;

(S)-4-(8-nonenyloxy)benzoic acid 4-(4-methylhexyloxy)phenyl ester;

(S)-4-(5Z-heptenyloxy)benzoic acid 4-(4-methylhexyloxy)phenyl ester;

(S)-4-(5Z-nonenyloxy)benzoic acid 4-(4-methylhexyloxy)phenyl ester;

(S)-4-(5Z-decenyloxy)benzoic acid 4-(4-methylhexyloxy)phenyl ester;

(S)-4-(5Z-undecenyloxy)benzoic acid 4-(4-methylhexyloxy)phenyl ester;

(S)-4-(7-octenyloxy)benzoic acid 4-(1-methylheptyloxy)phenyl ester;

(S)-4-(8-nonenyloxy)benzoic acid 4-(1-methylheptyloxy)phenyl ester;

(S)-4-(9-decenyloxy)benzoic acid 4-(1-methylheptyloxy)phenyl ester;

(S)-4-(10-undecenyloxy)benzoic acid 4-(1-methylheptyloxy)phenyl ester;

(S)-4-(5Z-octenyloxy)benzoic acid 4-(1-methylheptyloxy)phenyl ester;

(S)-4-(8-nonenyloxy)benzoic acid 4-(6-methyloctyloxy)phenyl ester;

(S)-4-(5Z-heptenyloxy)benzoic acid 4-(6-methyloctyloxy)phenyl ester;

(S)-4-(5Z-nonenyloxy)benzoic acid 4-(6-methyloctyloxy)phenyl ester;

(S)-4-(5Z-decenyloxy)benzoic acid 4-(6-methyloctyloxy)phenyl ester;
(S)-4-(5Z-undecenyloxy)benzoic acid 4-(6-methyloctyloxy)phenyl ester;
(S)-4'-(5-hexenyloxy)-4-biphenylcarboxylic acid 4-(4-methylhexyloxy)phenyl ester;
(S)-4'-(7-octenyloxy)-4-biphenylcarboxylic acid 4-(4-methylhexyloxy)phenyl ester;
(S)-4'-(9-decenyloxy)-4-biphenylcarboxylic acid 4-(methylhexyloxy)phenyl ester;
(S)-4'-(5Z-octenyloxy)-4-biphenylcarboxylic acid 4-(4-methylhexyloxy)phenyl ester;
(S)-4'-(5-hexenyloxy)-4-biphenylcarboxylic acid 4-(6-methyloctyloxy)phenyl ester;
(S)-4'-(7-octenyloxy)-4-biphenylcarboxylic acid 4-(6-methyloctyloxy)phenyl ester;
(S)-4'-(9-decenyloxy)-4-biphenylcarboxylic acid 4-(6-methyloctyloxy)phenyl ester;
(S)-4'-(5Z-octenyloxy)-4-biphenylcarboxylic acid 4-(6-methyloctyloxy)phenyl ester;
(S)-4'-(7-octenyloxy)-4-biphenylcarboxylic acid 4-(1-methylheptyloxy)phenyl ester;
(S)-4'-(8-nonenyloxy)-4-biphenylcarboxylic acid 4-(1-methylheptyloxy)phenyl ester;
(S)-4'-(9-decenyloxy)-4-biphenylcarboxylic acid 4-(1-methylheptyloxy)phenyl ester;
(S)-4'-(5Z-octenyloxy)-4-biphenylcarboxylic acid 4-(1-methylheptyloxy)phenyl ester;
(S)-4-(9-decenyloxy)benzoic acid 4'-(2-methylbutyloxy)-4-biphenylyl ester;
(S)-4-(7-octenyloxy)benzoic acid 4'-(4-methylhexyloxy)-4-biphenylyl ester;
(S)-4-(9-decenyloxy)benzoic acid 4'-(4-methylhexyl-4-biphenylyl ester;
(S)-4-(5Z-octenyloxy)benzoic acid 4'-(4-methylhexyl-4-biphenylyl ester;
(S)-4-(7-octenyloxy)benzoic acid 4'-(6-methyloctyloxy)-4-biphenylyl ester;
(S)-4-(9-decenyloxy)benzoic acid 4'-(6-methyloctyloxy)-4-biphenylyl ester;
(S)-4-(5Z-decenyloxy)benzoic acid 4'-(6-methyloctyloxy)-4-biphenylyl ester;
(S)-4-(7-octenyloxy)benzoic acid 4'-(1-methylheptyloxy)-4-biphenylyl ester;
(S)-4-(8-nonenyloxy)benzoic acid 4'-(1-methylheptyloxy)-4-biphenylyl ester;
(S)-4-(9-decenyloxy)benzoic acid 4'-(1-methylheptyloxy)-4-biphenylyl ester;
(S)-4-(5Z-octenyloxy)benzoic acid 4'-(1-methylheptyloxy)-4-biphenylyl ester;
(S)-4-(8-nonenyloxy)benzoic acid 4-(5-[5-methylheptyl]-2-pyrimidinyl)phenyl ester;
(S)-4-(5Z-heptenyloxy)benzoic acid 4-(5-[5-methylheptyl]-2-pyrimidinyl)phenyl ester;
(S)-4-(5Z-octenyloxy)benzoic acid 4-(5-[5-methylheptyl]-2-pyrimidinyl)phenyl ester;
(S)-4-(5Z-nonenyloxy)benzoic acid 4-(5-[5-methylheptyl]-2-pyrimidinyl)phenyl ester;
(S)-4-(8-nonenyloxy)benzoic acid 4-(5-[6-methyloctyl]-2-pyrimidinyl)phenyl ester;
(S)-4-(5Z-heptenyloxy)benzoic acid 4-(5-[6-methyloctyl]-2-pyrimidinyl)phenyl ester;
(S)-4-(5Z-octenyl)benzoic acid 4-(5-[6-methyloctyl]-2-pyrimidinyl)phenyl ester;
(S)-4-(5Z-nonenyl)benzoic acid 4-(5-[6-methyloctyl]-2-pyrimidinyl)phenyl ester.
4-(5-hexenyloxy)benzoic acid 4-butyloxyphenyl ester;
4-(5-hexenyloxy)benzoic acid 4-pentyloxyphenyl ester;
4-(5-hexenyloxy)benzoic acid 4-hexyloxyphenyl ester;
4-(5-hexenyloxy)benzoic acid 4-heptyloxyphenyl ester;
4-(5-hexenyloxy)benzoic acid 4-octyloxyphenyl ester;
4-(5-hexenyloxy)benzoic acid 4-nonyloxyphenyl ester;
4-(6-heptenyloxy)benzoic acid 4-butyloxyphenyl ester;
4-(6-heptenyloxy)benzoic acid 4-pentyloxyphenyl ester;
4-(6-heptenyloxy)benzoic acid 4-hexyloxyphenyl ester;
4-(6-heptenyloxy)benzoic acid 4-heptyloxyphenyl ester;
4-(6-heptenyloxy)benzoic acid 4-octyloxyphenyl ester;
4-(6-heptenyloxy)benzoic acid 4-nonyloxyphenyl ester;
4-(7-octenyloxy)benzoic acid 4-butyloxyphenyl ester;
4-(7-octenyloxy)benzoic acid 4-pentyloxyphenyl ester;
4-(7-octenyloxy)benzoic acid 4-hexyloxyphenyl ester;
4-(7-octenyloxy)benzoic acid 4-heptyloxyphenyl ester;
4-(7-octenyloxy)benzoic acid 4-octyloxyphenyl ester;
4-(7-octenyloxy)benzoic acid 4-nonyloxyphenyl ester;
4-(8-nonenyloxy)benzoic acid 4-butyloxyphenyl ester;
4-(8-nonenyloxy)benzoic acid 4-pentyloxyphenyl ester;
4-(8-nonenyloxy)benzoic acid 4-hexyloxyphenyl ester;
4-(8-nonenyloxy)benzoic acid 4-heptyloxyphenyl ester;
4-(8-nonenyloxy)benzoic acid 4-octyloxyphenyl ester;
4-(9-decenyloxy)benzoic acid 4-butyloxyphenyl ester;
4-(9-decenyloxy)benzoic acid 4-pentyloxyphenyl ester;
4-(9-decenyloxy)benzoic acid 4-hexyloxyphenyl ester;
4-(9-decenyloxy)benzoic acid 4-heptyloxyphenyl ester;
4-(10-undecenyloxy)benzoic acid 4-butyloxyphenyl ester;
4-(10-undecenyloxy)benzoic acid 4-pentyloxyphenyl ester;
4-(10-undecenyloxy)benzoic acid 4-hexyloxyphenyl ester;
4-(10-undecenyloxy)benzoic acid 4-heptyloxyphenyl ester;
4'-(5-hexenyloxy)-4-biphenylcarboxylic acid 4-butyloxyphenyl ester;
4'-(5-hexenyloxy)-4-biphenylcarboxylic acid 4-pentyloxyphenyl ester;
4'-(5-hexenyloxy)-4-biphenylcarboxylic acid 4-hexyloxyphenyl ester;
4'-(5-hexenyloxy)-4-biphenylcarboxylic acid 4-heptyloxyphenyl ester;
4'-(6-heptenyloxy)-4-biphenylcarboxylic acid 4-butyloxyphenyl ester;
4'-(6-heptenyloxy)-4-biphenylcarboxylic acid 4-pentyloxyphenyl ester;
4'-(6-heptenyloxy)-4-biphenylcarboxylic acid 4-hexyloxyphenyl ester;
4'-(6-heptenyloxy)-4-biphenylcarboxylic acid 4-heptyloxyphenyl ester;
4-(5-hexenyloxy)benzoic acid 4'-butyloxy-4-biphenylyl ester;
4-(5-hexenyloxy)benzoic acid 4'-pentyloxy-4-biphenylyl ester;
4-(5-hexenyloxy)benzoic acid 4'-hexyloxy-4-biphenylyl ester;
4-(5-hexenyloxy)benzoic acid 4'-heptyloxy-4-biphenylyl ester;
4-(6-heptenyloxy)benzoic acid 4'-butyloxy-4-biphenylyl ester;
4-(6-heptenyloxy)benzoic acid 4'-pentyloxy-4-biphenylyl ester;
4-(6-heptenyloxy)benzoic acid 4'-hexyloxy-4-biphenylyl ester;
4-(6-heptenyloxy)benzoic acid 4'-heptyloxy-4-biphenylyl ester;
4-(5-hexenyloxy)benzoic acid 4-(5-hexyl-2-pyrimidinyl)phenyl ester;

4-(5-hexenyloxy)benzoic acid 4-(5-heptyl-2-pyrimidinyl) phenyl ester;
4-(5-hexenyloxy)benzoic acid 4-(5-octyl-2-pyrimidinyl)phenyl ester;
4-(6-heptenyloxy)benzoic acid 4-(5-hexyl-2-pyrimidinyl)phenyl ester;
4-(6-heptenyloxy)benzoic acid 4-(5-heptyl-2-pyrimidinyl)phenyl ester;
4-(6-heptenyloxy)benzoic acid 4-(5-octyl-2-pyrimidinyl)phenyl ester;
4-(7-octenyloxy)benzoic acid 4-(5-hexyl-2-pyrimidinyl)phenyl ester;
4-(7-octenyloxy)benzoic acid 4-(5-heptyl-2-pyrimidinyl)phenyl ester;
4-(7-octenyloxy)benzoic acid 4-(5-octyl-2-pyrimidinyl)phenyl ester;
4-(8-nonenyloxy)benzoic acid 4-(5-hexyl-2-pyrimidinyl)phenyl ester;
4-(8-nonenyloxy)benzoic acid 4-(5-heptyl-2-pyrimidinyl)phenyl ester;
4-(8-nonenyloxy)benzoic acid 4-(5-octyl-2-pyrimidinyl)phenyl ester;
4-(9-decenyloxy)benzoic acid 4-(5-hexyl-2-pyrimidinyl)phenyl ester;
4-(9-decenyloxy)benzoic acid 4-(5-heptyl-2-pyrimidinyl)phenyl ester;
4-(9-decenyloxy)benzoic acid 4-(5-octyl-2-pyrimidinyl)phenyl ester;
4-(10-undecenyloxy)benzoic acid 4-(5-hexyl-2-pyrimidinyl)phenyl ester;
4-(10-undecenyloxy)benzoic acid 4-(5-heptyl-2-pyrimidinyl)phenyl ester;
4-(10-undecenyloxy)benzoic acid 4-(5-octyl-2-pyrimidinyl)phenyl ester;
trans-4-(5-hexenyl)cyclohexanecarboxylic acid 4-(5-nonyl-2-pyrimidinyl)phenyl ester;
trans-4-(5-hexenyl)cyclohexanecarboxylic acid 4-(5-decyl-2-pyrimidinyl)phenyl ester;
trans-4-(6-heptenyl)cyclohexanecarboxylic acid-4-(5-octyl-2-pyrimidinyl)phenyl ester;
trans-4-(6-heptenyl)cyclohexanecarboxylic acid 4-(5-nonyl-2-pyrimidinyl)phenyl ester;
trans-4-(6-heptenyl)cyclohexanecarboxylic acid 4-(5-pyrimidinyl)phenyl ester;
trans-4-(7-octenyl)cyclohexanecarboxylic acid 4-(5-octyl-2-pyrimidinyl)phenyl ester;
trans-4-(7-octenyl)cyclohexanecarboxylic 4-(5-nonyl-2-pyrimidinyl)phenyl ester;
trans-4-(7-octenyl)cyclohexanecarboxylic acid 4-(5-decyl-2-pyrimidinyl)phenyl ester;
4-(9-decenyloxy)benzoic acid 4-(trans-5-nonyl-m-dioxan-2-yl)phenyl ester;
4-(9-decenyloxy)benzoic acid 4-(trans-5-decyl-m-dioxan-2-yl)phenyl ester;
4-(10-undecenyloxy)benzoic acid 4-(trans-5-octyl-m-dioxan-2-yl)phenyl ester;
4-(11-dodecenyloxy)benzoic acid 4-(trans-5-octyl-m-dioxan-2-yl)phenyl ester;
(S)-4-(4-pentenyl)benzoic acid 5-[4-(2-methylbutyloxy)-phenyl]pyrazinyl ester;
(S)-4-(5-hexenyl)benzoic acid 5-[4-(2-methylbutyloxy)-phenyl]pyrazinyl ester;
(S)-4-(6-heptenyl)benzoic acid 5-[4-(2-methylbutyloxy)-phenyl]pyrazinyl ester;
(S)-4-(7-octenyl)benzoic acid 5-[4-(2-methylbutyloxy)-phenyl]pyrazinyl ester;
(S)-4-(8-nonenyl)benzoic acid 5-[4-(2-methylbutyloxy)-phenyl]pyrazinyl ester;
(S)-4-(9-decenyl)benzoic acid 5-[4-(2-methylbutyloxy)-phenyl]pyrazinyl ester;
(S)-4-(10-undecenyl)benzoic acid 5-[4-(2-methylbutyloxy)-phenyl]pyrazinyl ester;
(S)-4-(4-pentenyl)benzoic acid 5-[4-(4-methylhexyloxy)phenyl]pyrazinyl ester;
(S)-4-(5-hexenyl)benzoic acid 5-[4-(4-methylhexyloxy)-phenyl]pyrazinyl ester;
(S)-4-(6-heptenyl)benzoic acid 5-[4-(4-methylhexyloxy)phenyl]pyrazinyl ester;
(S)-4-(7-octenyl)benzoic acid 5-[4-(4-methylhexyloxy)-phenyl]pyrazinyl ester;
(S)-4-(8-nonenyl)benzoic acid 5-[4-(4-methylhexyloxy)-phenyl]pyrazinyl ester;
(S)-4-(9-decenyl)benzoic acid 5-[4-(4-methylhexyloxy)-phenyl]pyrazinyl ester;
(S)-4-(10-undecenyl)benzoic acid 5-[4-(4-methylhexyloxy)phenyl]pyrazinyl ester;
(S)-4-(5-hexenyl)benzoic acid 5-[4-(6-methyloctyloxy)-phenyl]pyrazinyl ester;
(S)-4-(6-heptenyl)benzoic acid 5-[4-(6-methyloctyloxy)-phenyl]pyrazinyl ester;
(S)-4-(7-octenyl)benzoic acid 5-[4-(6-methyloctyloxy)-phenyl]pyrazinyl ester;
(S)-4-(8-nonenyl)benzoic acid 5-[4-(6-methyloctyloxy)-phenyl]pyrazinyl ester;
(S)-4-(9-decenyl)benzoic acid 5-[4-(6-methyloctyloxy)-phenyl]pyrazinyl ester;
(S)-4-(10-undecenyl)benzoic acid 5-[4-(6-methyloctyloxy)phenyl]pyrazinyl ester;
4-(4-pentenyl)benzoic acid 5-(4-octyloxyphenyl)pyrazinyl ester;
4-(5-hexenyl)benzoic acid 5-(4-octyloxyphenyl)pyrazinyl ester;
4-(6-heptenyl)benzoic acid 5-(4-octyloxyphenyl)pyrazinyl ester;
04-(7-octenyl)benzoic acid 5-(4-octyloxyphenyl)pyrazinyl ester;
4-(8-nonenyl)benzoic acid 5-(4-octyloxyphenyl)pyrazinyl ester;
4-(9-decenyl)benzoic acid 5-(4-octyloxyphenyl)pyrazinyl ester;
4-(10-undecenyl)benzoic acid 5-(4-octyloxyphenyl)-pyrazinyl ester.

EXAMPLE 2

A mixture of 0.5 g of (S)-4-(6-Methylhexyloxy)benzoic acid, 10 ml of thionylchloride (excess) and 40 ml of toluene was heated to boiling for 1 hour. The solvent and excess thionylchloride were subsequently distilled off and the residue was taken up twice in 25 ml of toluene and concentrated each time.

The crude (S)-4-(6-methylhexyloxy)benzoyl chloride obtained was dissolved in 40 ml of toluene and then added dropwise to a solution of 0.53 g of 4-(9-decenyloxy)phenol in 5 ml of pyridine. The reaction mixture was stirred at room temperature overnight, then poured into ice-water and extracted three times with 50 ml of diethyl ether each time. The extract was washed with 25 ml of 3N hydrochloric acid, then with 25 ml of 2N sodium carbonate solution and several times with water, dried over magnesium sulphate and concentrated. Chromatography of the thus-obtained crude product on silica gel with toluene and recrystallization from methanol at 0° C. gave pure (S)-4-(4-methylhexyloxy)benzoic acid 4-(9-decenyloxy)phenyl ester; m.p. (C-$S_C^*$) 25° C. phase transition ($S_C^*$-Ch) 40° C., cl.p. (Ch-I) 56° C.

The 4-(9-decenyloxy)phenol used as the starting material was prepared as follows:

(a) A mixture of 18 g of 9-decen-1-yl p-tosylate, 12.8 g of hydroquinone, 3.6 g potassium hydroxide, 1 ml of water and 75 ml of ethanol was heated under reflux overnight. The cooled reaction mixture was subsequently poured into ice-water and extracted three times with 50 ml of diethyl ether each time. The organic Phases were washed with 500 ml of water, dried over magnesium sulphate and concentrated. Chromatography of the residue on silica gel with toluene/ethyl acetate (vol. 4:1) gave 7.5 g of 4-(9-decenyloxy)phenol; m.p. 54°–55° C.

The following compounds were manufactured in an analogous manner:

(S)-4-(2-Methylbutyloxy)benzoic acid 4-(3-butenyloxy)-phenyl ester, m.p. (C-I) 48° C.;

(S)-4-(2-methylbutyloxy)benzoic acid 4-(4-pentenyloxy)phenyl ester, m.p (C-I) 55° C.;

(S)-4-(2-methylbutyloxy)benzoic acid 4-(5-hexenyloxy)-phenyl ester, m.p. (C-I) 50.5° C., cl.p. (Ch-I) 31° C.;

(S)-4-(2-methylbutyloxy)benzoic acid 4-(6-heptenyloxy)phenyl ester, m.p. (C-I) 51.5° C., cl.p. (Ch-I) 44° C.;

(S)-4-(2-methylbutyloxy)benzoic acid 4-(7-octenyloxy)-phenyl ester, m.p. (C-I) 51° C., cl.p. (Ch-I) 38° C.;

(S)-4-(2-methylbutyloxy)benzoic acid 4-(9-decenyloxy)-phenyl ester, m.p (C-I) 49° C., cl.p (Ch-I) 37.5° C.;

(S)-4-(2-methylbutyloxy)benzoic acid 4-(10-undecenyloxy)phenyl ester, m.p. (C-Ch) 45.5° C., cl.p. (Ch-I) 45° C.;

(S)-4-(4-methylheXyloxy)benzoic acid 4-(3-butenyloxy)phenyl ester, m.p. (C-I) 58° C., phase transition (S$_C$*-Ch) 17° C. cl.p. (Ch-I) 39° C.;

(S)-4-(4-methylhexyloxy)benzoic acid 4-(4-pentenyloxy)phenyl ester, m.p. (C-Ch) 41° C., phase transition (S$_C$*-Ch) 34° C. cl.p. (Ch-I) 57.5° C.;

(S)-4-(4-methylhexyloxy)benzoic acid 4-(5-hexenyloxy)phenyl ester, m.p. (C-Ch) 38° C., phase transition (S$_C$*-Ch) 34.5° C., cl.p. (Ch-I) 49.5° C.;

(S)-4-(4-methylhexyloxy)benzoic acid 4-(6-heptenyloxy)phenyl ester, m.p. (C-S$_C$*) 32.5° C., phase transition (S$_C$*-Ch) 36.5° C., cl.p. (Ch-I) 61° C.;

(S)-4-(4-methylhexyloxy)benzoic acid 4-(7-octenyloxy)-phenyl ester, m.p. (C-S$_C$*) 29.5° C., phase transition (S$_C$*-Ch) 40° C., cl.p. (Ch-I) 55.5° C.;

(S)-4-(4-methylhexyloxy)benzoic acid 4-(10-undecenyloxy)phenyl ester, m.p. (C-S$_C$*) 34° C., phase transition (S$_C$*-Ch) 41.5° C., cl.p. (Ch-I) 61° C.;

(S)-4-(4-methylhexyloxy)benzoic acid 4-(5Z-octenyloxy)phenyl ester, m.p. (C-S$_C$*) 22° C., phase transition (S$_C$*-Ch) 40.5° C., cl.p. (Ch-I) 46° C.;

(S)-4-(6-methyloctyloxy)benzoic acid 4-(3-butenyloxy)-phenyl ester, m.p. (C-Ch) 43° C., phase transition (S$_C$*-Ch) 41° C., cl.p. (Ch-I) 51.5° C.;

(S)-4-(6-methyloctyloxy)benzoic acid 4-(4-pentenyloxy)phenyl ester, m.p. (C-S$_C$*) 48° C. phase transition (S$_C$*-Ch) 53.5° C., cl.p. (Ch-I) 66° C.;

(S)-4-(6-methyloctyloxy)benzoic acid 4-(5-hexenyloxy)-phenyl ester, m.p. (C-S$_C$*) 38.5° C., phase transition (S$_C$*-Ch) 51° C., cl.p. (Ch-I) 59° C.;

(S)-4-(6-methyloctyloxy)benzoic acid 4-(6-heptenyloxy)phenyl ester, m.p. (C-S$_C$*) 39° C., phase transition (S$_C$*-Ch) 56° C., cl.p. (Ch-I) 68.5° C.;

(S)-4-(6-methyloctyloxy)benzoic acid 4-(7-octenyloxy)-phenyl ester, m.p. (C-S$_C$*) 37.5° C., phase transition (S$_C$*-Ch) 57° C., cl.p. (Ch-I) 65° C.;

(S)-4-(6-methyloctyloxy)benzoic acid 4-(9-decenyloxy)-phenyl ester, m.p. (C-S$_C$*) 45° C. phase transition (S$_C$*-Ch) 60° C. cl.p. (Ch-I) 66.5° C.;

(S)-4-(6-methyloctyloxy)benzoic acid 4-(10-undecenyloxy)phenyl ester, m.p. (C-S$_C$*) 44.5° C., phase transition (S$_C$*-Ch) 62.5° C., cl.p. (Ch-I) 70° C;

(S)-4-(6-methyloctyloxy)benzoic acid 4-(5Z-octenyloxy)phenyl ester, m.p. (C-S$_C$*) 34° C., phase transition (S$_C$*-Ch) 55.5° C., cl.p. (Ch-I) 56° C.;

(S)-4'-(2-methylbutyl)-4-biphenylcarboxylic acid 4-(2-propenyloxy)phenyl ester, m.p. (C-Ch) 98° C., cl.p. (Ch-I) 185° C.;

(S)-4'-(2-methylbutyl)-4-biphenylcarboxylic acid 4-(3-butenyloxy)phenyl ester, m.p. (C-Ch) 87.5° C., phase transition (S-S$_C$*) 53.5° C., phase transition (S$_C$*-Ch) 68° C., cl.p. (Ch-I) 160° C.;

(S)-4'-(2-methylbutyl)-4-biphenylcarboxylic acid 4-(4-pentenyloxy)phenyl ester, m.p. (C-S$_C$*) 73° C., phase transition (S-S$_C$*) 56.5° C., phase transition (S$_C$*-Ch) 78.5° C., cl.p. (Ch-I) 169° C.;

(S)-4'-(2-methylbutyl)-4-biphenylcarboxylic acid 4-(5-hexenyloxy)phenyl ester, m.p. (C-S$_C$*) 66° C., phase transition (S-S$_C$*) 52° C., phase transition (S$_C$*-Ch) 79° C., cl.p. (Ch-I) 153.5° C.;

(S)-4'-(2-methylbutyl)-4-biphenylcarboxylic acid 4-(6-heptenyloxy)phenyl ester, m.p. (C-S$_C$*) 59° C., phase transition (S-S$_C$*) 37° C., phase transition (S$_C$*-Ch) 77° C., cl.p. (Ch-I) 157° C.;

(S)-4'-(2-methylbutyl)-4-biphenylcarboxylic acid 4-(7-octenyloxy)phenyl ester, m.p. (C-S$_C$*) 72° C., phase transition (S$_C$*-Ch) 80.5° C., cl.p. (Ch-I) 148° C.;

(S)-4'-(2-methylbutyl)-4-biphenylcarboxylic acid 4-(9-decenyloxy)phenyl ester, m.p. (C-S$_C$*) 70° C., phase transition (S$_C$*-Ch) 83° C., cl.p. (Ch-I) 141.5° C.;

(S)-4'-(2-methylbutyl)-4-biphenylcarboxylic acid 4-(10-undecenyloxy)phenyl ester, m.p. (C-S$_C$*) 67.5° C., phase transition (S$_C$*-Ch) 84.5° C., cl.p. (Ch-I) 142° C.;

(S)-4'-(3-methylpentyl)-4-biphenylcarboxylic acid 4-(2-propenyloxy)phenyl ester, m.p. (C-S$_A$) 132° C., phase transition (S$_C$*-S$_A$) 109° C., phase transition (S$_A$-Ch) 134° C., cl.p. (Ch-I) 176.5° C.;

(S)-4'-(3-methylpentyl)-4-biphenylcarboxylic acid 4-(3-butenyloxy)phenyl ester, m.p. (C-S$_C$*) 105.5° C., phase transition (S-S$_C$*) 71° C., phase transition (S$_C$*-S$_A$) 116° C., phase transition (S$_A$-Ch) 129.5° C., cl.p. (Ch-I) 160° C.;

(S)-4'-(3-methylpentyl)-4-biphenylcarboxylic acid 4-(4-pentenyloxy)phenyl ester, m.p. (C-S$_C$*) 96° C., phase transition (S-S$_C$*) 74.5° C., phase transition (S$_C$*-S$_A$) 125.5° C., phase transition (S$_A$-Ch) 135° C., cl.p. (Ch-I) 168.5° C.;

(S)-4'-(3-methylpentyl)-4-biphenylcarboxylic acid 4-(5-hexenyloxy)phenyl ester, m.p. (C-S$_C$*) 92° C., phase transition (S-S$_C$*) 68.5° C. phase transition (S$_C$*-S$_A$) 122° C., phase transition (S$_A$-Ch) 128° C., cl.p. (Ch-I) 155° C.;

(S)-4'-(3-methylpentyl)-4-biphenylcarboxylic acid 4-(6-heptenyloxy)phenyl ester, m.p. (C-S$_C$*) 86° C., phase transition (S-S$_C$*) 47° C., phase transition (S$_C$*-S$_A$) phase transition (S$_A$-Ch) 129° C., cl.p. (Ch-I) 158° C.;

(S)-4'-(3-methylpentyl)-4-biphenylcarboxylic acid 4-(7-octenyloxy)phenyl ester, m.p. (C-S$_C$*) 78° C., phase transition (S$_C$*-S$_A$) 119.5° C., phase transition (S$_A$-Ch) 127.5° C., cl.p. (Ch-I) 150° C.;

(S)-4'-(3-methylpentyl)-4-biphenylcarboxylic acid 4-(9-decenyloxy)phenyl ester, m:p. (C-S$_C$*) 73° C., phase transition ($S_C^*$-$S_A$) 117.5° C., phase transition, ($S_A$-Ch) 130.5° C., cl.p. (Ch-I) 146° C.;

(S)-4'-(3-methylpentyl)-4-biphenylcarboxylic acid 4-(10-undecenyloxy)phenyl ester, m.p. (C-$S_C^*$) 77.5° C., phase transition ($S_C^*$-$S_A$) 114° C., phase transition ($S_A$-Ch) 131.5° C., cl.p. (Ch-I) 146.5° C.;

(S)-4'-(2-methylbutyloxy)-4-biphenylcarboxylic acid 4-(2-propenyloxy)phenyl ester, m.p. (C-$S_A$) 162° C., phase transition ($S_A$-Ch) 162.5° C., cl.p. (Ch-I) 198° C.;

(S)-4'-(2-methylbutyloxy)-4-biphenylcarboxylic acid 4-(3-butenyloxy)phenyl ester, m.p. (C-$S_C^*$) 133° C., phase transition ($S_C^*$-$S_A$) 134.5° C., phase transition ($S_A$-Ch) 158.5° C., cl.p. (Ch-I) 181.5° C.;

(S)-4'-(2-methylbutyloxy)-4-biphenylcarboxylic acid 4-(4-pentenyloxy)phenyl ester, m.p. (C-$S_C^*$) 115° C., phase transition ($S_C^*$-$S_A$) 141° C., phase transition ($S_A$-Ch) 161° C., cl.p. (Ch-I) 189° C.;

(S)-4'-(2-methylbutyloxy)-4-biphenylcarboxylic acid 4-(5-hexenyloxy)phenyl ester, m.p. (C-$S_C^*$) 96° C., phase transition ($S_C^*$-$S_A$) 137° C., phase transition ($S_A$-Ch) 154.5° C., cl.p. (Ch-I) 176° C.;

(S)-4'-(2-methylbutyloxy)-4-biphenylcarboxylic acid 4-(6-heptenyloxy)phenyl ester, m.p. (C-$S_C^*$) 97.5° C., phase transition ($S_C^*$-$S_A$) 133° C., phase transition ($S_A$-Ch) 154.5° C., cl.p. (Ch-I) 177.5° C.;

(S)-4'-(2-methylbutyloxy)-4-biphenylcarboxylic acid 4-(7-octenyloxy)phenyl ester, m.p. (C-$S_C^*$) 97.5° C., phase transition ($S_C^*$-$S_A$) 130.5° C., phase transition ($S_A$-Ch) 153.5° C., cl.p. (Ch-I) 169.5° C.;

(S)-4'-(2-methylbutyloxy)-4-biphenylcarboxylic acid 4-(9-decenyloxy)phenyl ester, m.p. (C-$S_C^*$) 99.5° C., phase transition ($S_C^*$-$S_A$) 126° C., phase transition ($S_A$-Ch) 154.5° C., cl.p. (Ch-I) 165° C.;

(S)-4'-(2-methylbutyloxy)-4-biphenylcarboxylic acid 4-(10-undecenyloxy)phenyl ester, m.p. (C-$S_C^*$) 97.5° C., phase transition ($S_C^*$-$S_A$) 124.5° C., phase transition ($S_A$-Ch) 154.5° C., cl.p. (Ch-I) 164° C.

The optical antipodes of the optically active compounds and following compounds, including the optical antipodes of the optically active compounds, could be manufactured in an analogous manner:

(S)-4-(2-methylbutyloxy)benzoic acid 4-(8-nonenyloxy)phenyl ester;

(S)-4-(2-methylbutyloxy)benzoic acid 4-(5Z-octenyloxy)phenyl ester;

(S)-4-(4-methylhexyloxy)benzoic acid 4-(8-nonenyloxy)phenyl ester;

(S)-4-(4-methylhexyloxy)benzoic acid 4-(5Z-heptenyloxy)phenyl ester;

(S)-4-(4-methylhexyloxy)benzoic acid 4-(5Z-nonenyloxy)phenyl ester;

(S)-4-(4-methylhexyloxy)benzoic acid 4-(5Z-decenyloxy)phenyl ester;

(S)-4-(4-methylhexyloxy)benzoic acid 4-(5Z-undecenyloxy)phenyl ester;

(S)-4-(1-methylheptyloxy)benzoic acid 4-(3-butenyloxy)phenyl ester;

(S)-4-(1-methylheptyloxy)benzoic acid 4-(4-pentenyloxy)phenyl ester;

(S)-4-(1-methylheptyloxy)benzoic acid 4-(5-hexenyloxy)phenyl ester;

(S)-4-(1-methylheptyloxy)benzoic acid 4-(6-heptenyloxy)phenyl ester;

(S)-4-(1-methylheptyloxy)benzoic acid 4-(7-octenyloxy)phenyl ester;

(S)-4-(1-methylheptyloxy)benzoic acid 4-(8-nonenyloxy)phenyl ester;

(S)-4-(1-methylheptyloxy)benzoic acid 4-(9-decenyloxy)phenyl ester;

(S)-4-(1-methylheptyloxy)benzoic acid 4-(10-undecenyloxy)phenyl ester;

(S)-4-(1-methylheptyloxy)benzoic acid 4-(5Z-heptenyloxy)phenyl ester;

(S)-4-(1-methylheptyloxy)benzoic acid 4-(5Z-octenyloxy)phenyl ester;

(S)-4-(1-methylheptyloxy)benzoic acid 4-(5Z-nonenyloxy)phenyl ester;

(S)-4-(1-methylheptyloxy)benzoic acid 4-(5Z-decenyloxy)phenyl ester;

(S)-4-(1-methylheptyloxy)benzoic acid 4-(5Z-undecenyloxy)phenyl ester;

(S)-4-(6-methyloctyloxy)benzoic acid 4-(5-nonenyloxy)phenyl ester;

(S)-4-(6-methyloctyloxy)benzoic acid 4-(5Z-heptenyloxy)phenyl ester;

(S)-4-(6-methyloctyloxy)benzoic acid 4-(5Z-nonenyloxy)phenyl ester;

(S)-4-(6-methyloctyloxy)benzoic acid 4-(5Z-decenyloxy)phenyl ester;

(S)-4-(6-methyloctyloxy)benzoic acid 4-(5Z-undecenyloxy)phenyl ester;

(S)-4'-(2-methylbutyl)-4-biphenylcarboxylic acid 4-(8-nonenyloxy)phenyl ester;

(S)-4'-(3-methylpentyl)-4-biphenylcarboxylic acid 4-(8-nonenyloxy)phenyl ester;

(S)-4'-(3-methylpentyl)-4-biphenylcarboxylic acid 4-(5Z-heptenyloxy)phenyl ester;

(S)-4'-(3-methylpentyl)-4-biphenylcarboxylic acid 4-(5Z-octenyloxy)phenyl ester;

(S)-4'-(3-methylpentyl)-4-biphenylcarboxylic acid 4-(5Z-nonenyloxy)phenyl ester;

(S)-4'-(3-methylpentyl)-4-biphenylcarboxylic acid 4-(5Z-decenyloxy)phenyl ester;

(S)-4'-(2-methylbutyloxy)-4-biphenylcarboxylic acid 4-(8-nonenyloxy)phenyl ester;

(S)-4'-(2-methylbutyloxy)-4-biphenylcarboxylic acid 4-(5Z-heptenyloxy)phenyl ester;

(S)-4'-(2-methylbutyloxy)-4-biphenylcarboxylic acid 4-(5Z-octenyloxy)phenyl ester;

(S)-4'-(2-methylbutyloxy)-4-biphenylcarboxylic acid 4-(5Z-nonenyloxy)phenyl ester;

(S)-4'-(2-methylbutyloxy)-4-biphenylcarboxylic acid 4-(5Z-decenyloxy)phenyl ester;

(S)-4'-(2-methylbutyloxy)-4-biphenylcarboxylic acid 4-(5Z-undecenyloxy)phenyl ester;

(S)-4'-(4-methylhexyloxy)-4-biphenylcarboxylic acid 4-(7-octenyloxy)phenyl ester;

(S)-4'-(4-methylhexyloxy)-4-biphenylcarboxylic acid 4-(8-nonenyloxy)phenyl ester;

(S)-4'-(4-methylhexyloxy)-4-biphenylcarboxylic acid 4-(9-decenyloxy)phenyl ester;

(S)-4'-(4-methylhexyloxy)-4-biphenylcarboxylic acid 4-(5Z-octenyloxy)phenyl ester;

(S)-4'-(1-methylheptyloxy)-4-biphenylcarboxylic acid 4-(7-octenyloxy)phenyl ester;

(S)-4'-(1-methylheptyloxy)-4-biphenylcarboxylic acid 4-(8-nonenyloxy)phenyl ester;

(S)-4'-(1-methylheptyloxy)-4-biphenylcarboxylic acid 4-(9-decenyloxy)phenyl ester;

(S)-4'-(1-methylheptyloxy)-4-biphenylcarboxylic acid 4-(5Z-octenyloxy)phenyl ester;

(S)-4-(2-methylbutyloxy)benzoic acid 4-(7-octenyloxy)-4'-biphenylyl ester;

(S)-4-(2-methylbutyloxy)benzoic acid 4-(9-decenyloxy)-4'-biphenylyl ester;

(S)-4-(2-methylbutyloxy)benzoic acid 4-(5Z-octenyloxy)-4'-biphenylyl ester;
(S)-4-(4-methylhexyloxy)benzoic acid 4-(7-octenyloxy)-4'-biphenylyl ester;
(S)-4-(4-methylhexyloxy)benzoic acid 4-(9-decenyloxy)-4'-biphenylyl ester;
(S)-4-(4-methylhexyloxy)benzoic acid 4-(5Z-octenyloxy)-4'-biphenylyl ester;
(S)-4-(6-methyloctyloxy)benzoic acid 4-(7-octenyloxy)-4'-biphenylyl ester;
(S)-4-(6-methyloctyloxy)benzoic acid 4-(9-decenyloxy)-4'-biphenylyl ester;
(S)-4-(6-methyloctyloxy)benzoic acid 4-(5Z-octenyloxy)-4'-biphenylyl ester;
(S)-4-(1-methylheptyloxy)benzoic acid 4-(7-octenyloxy)-4'-biphenylyl ester;
(S)-4-(1-methylheptyloxy)benzoic acid 4-(8-nonenyl)-4'-biphenylyl ester;
(S)-4-(1-methylheptyloxy)benzoic acid 4-(9-decenyl)-biphenylyl ester;
(S)-4-(1-methylheptyloxy)benzoic acid 4-(5Z-octenyl)-4'-biphenylyl ester;
4-hexyloxybenzoic acid 4-(5-hexenyloxy)phenyl ester;
4-heptyloxybenzoic acid 4-(5-hexenyloxy)phenyl ester;
4-octyloxybenzoic acid 4-(5-hexenyloxy)phenyl ester;
4-nonyloxybenzoic acid 4-(5-hexenyloxy)phenyl ester;
4-decyloxybenzoic acid 4-(5-hexenyloxy)phenyl ester;
4-hexyloxybenzoic acid 4-(6-heptenyloxy)phenyl ester;
4-heptyloxybenzoic acid 4-(6-heptenyloxy)phenyl ester;
4-octyloxybenzoic acid 4-(6-heptenyloxy)phenyl ester;
4-nonyloxybenzoic acid 4-(6-heptenyloxy)phenyl ester;
4-pentyloxybenzoic acid 4(7-octenyloxy)phenyl ester;
4-hexyloxybenzoic acid 4(7-octenyloxy)phenyl ester;
4-heptyloxybenzoic acid 4(7-octenyloxy)phenyl ester;
4-octyloxybenzoic acid 4(7-octenyloxy)phenyl ester;
4-pentyloxybenzoic acid 4-(8-nonenyloxy)phenyl ester;
4-hexyloxybenzoic acid 4-(8-nonenyloxy)phenyl ester;
4-heptyloxybenzoic acid 4-(8-nonenyloxy)phenyl ester;
4-octyloxybenzoic acid 4-(8-nonenyloxy)phenyl ester;
4-pentyloxybenzoic acid 4-(9-decenyloxy)phenyl ester,
4-hexyloxybenzoic acid 4-(9-decenyloxy)phenyl ester,
4-heptyloxybenzoic acid 4-(9-decenyloxy)phenyl ester,
4-butyloxybenzoic acid 4-(10-undecenyloxy)phenyl ester;
4-pentyloxybenzoic acid 4-(10-undecenyloxy)phenyl ester;
4-hexyloxybenzoic acid 4-(10-undecenyloxy)phenyl ester;
4'-pentyl-4-biphenylcarboxylic acid 4-(4-pentenyloxy)phenyl ester;
4'-hexyl-4-biphenylcarboxylic acid 4-(4-pentenyloxy)phenyl ester;
4'-heptyl-4-biphenylcarboxylic acid 4-(4-pentenyloxy)phenyl ester;
4'-octyl-4-biphenylcarboxylic acid 4-(4-pentenyloxy)phenyl ester;
4'-pentyl-4-biphenylcarboxylic acid 4-(5-hexenyloxy)phenyl ester;
4'-hexyl-4-biphenylcarboxylic acid 4-(5-hexenyloxy)phenyl ester;
4'-heptyl-4-biphenylcarboxylic acid 4-(5-hexenyloxy)phenyl ester;
4'-octyl-4-biphenylcarboxylic acid 4-(5-hexenyloxy)phenyl ester;
4'-butyl-4-biphenylcarboxylic acid 4-(6-heptenyloxy)phenyl ester;
4'-pentyl-4-biphenylcarboxylic acid 4-(6-heptenyloxy)phenyl ester;
4'-hexyl-4-biphenylcarboxylic acid 4-(6-heptenyloxy)phenyl ester;
4'-heptyl-4-biphenylcarboxylic acid 4-(6-heptenyloxy)phenyl ester;
4'-butyl-4-biphenylcarboxylic acid 4-(7-octenyloxy)phenyl ester;
4'-pentyl-4-biphenylcarboxylic acid 4-(7-octenyloxy)phenyl ester;
4'-hexyl-4-biphenylcarboxylic acid 4-(7-octenyloxy)phenyl ester;
4'-heptyl-4-biphenylcarboxylic acid 4-(7-octenyloxy)phenyl ester;
4'-butyl-4-biphenylcarboxylic acid 4-(8-nonenyloxy)phenyl ester;
4'-pentyl-4-biphenylcarboxylic acid 4-(8-nonenyloxy)phenyl ester;
4'-hexyl-4-biphenylcarboxylic acid 4-(8-nonenyloxy)phenyl ester;
4'-pentyl-4-biphenylcarboxylic acid 4-(9-decenyloxy)phenyl ester.

EXAMPLE 3

A mixture of 0.66 g of 9-decen-1-yl-p-tosylate, 0.5 g of (S)-4-(5-[5-methylheptyl]-2-pyrimidinyl)phenol and 0.97 g of potassium carbonate and 50 ml of absolute butanone was heated under reflux overnight. The cooled reaction mixture was subsequently poured into ice-water and extracted three times with 50 ml of diethyl ether each time. The organic phases were washed with 500 ml of water, dried over magnesium sulphate and concentrated. Chromatography of the residue on silica gel with toluene and subsequent bulb-tube distillation gave 0.9 g of (S)-5-(5-methylheptyl)-2-(4-[9-decenyloxy]phenyl)pyrimidine; m.p. (C-$S_C$*) 19° C., phase transition ($S_C$*-Ch) 32.5° C., cl.p. (Ch-I) 43° C.

The (S)-4-(5-[5-methylheptyl]-2-pyrimidinyl)phenol used as the starting material was prepared as follows:

(a) A mixture of 23 g of (S)-2-(methoxymethylidene)-7-methylnonanal, 26.2 g of 4-isopropoxybenzamidine hydrochloride and 250 ml of absolute methanol was treated dropwise at 10° C. with 80 ml of a 5% solution of sodium methylate in methanol. The reaction mixture was stirred at room temperature overnight and subsequently made acid (pH 4–5) with concentrated hydrochloric acid, filtered and the filtrate was concentrated. The residue was taken up in 500 ml of dichloromethane, washed several times with water, dried over sodium sulphate and concentrated. Chromatography of the residue on silica gel with hexanethyl acetate (vol. 19:1) and recrystallization from methanol gave 22.2 g of (S)-2-(4-isopropoxyphenyl)-5-(5-methylheptyl)pyrimidine; m.p. 47.2°–47.7° C.

(b) A solution of 22.5 ml of titanium tetrachloride in 125 ml of dichloromethane was added dropwise within 1 hour at 0° C. while gassing with argon to a solution of 22.7 g of (S)-2-(4-isopropoxyphenyl)-5-(5-methylheptyl)pyrimidine in 300 ml of absolute dichloromethane. The reaction mixture was stirred at 0° C. for 45 minutes and at room temperature overnight and subsequently Poured into 1500 ml of ice-water. The organic phase was seParated and the aqueous phase was back-extracted twice with 200 ml of dichloromethane each time. The combined organic phases were washed several times with water, dried over sodium sulphate and concentrated. The crude (S)-4-(5-[5-methylheptyl]-2-pyrimidinyl)phenol was used without additional purification.

The following compounds were manufactured in an analogous manner:
(S)-5-(5-methylheptyl)-2-(4-[5-hexenyloxy]phenyl)-pyrimidine, m.p. (C-Ch) 29.5° C., cl.p. (Ch-I) 30.5° C.;
(S)-5-(5-methylheptyl)-2-(4-[6-heptenyloxy]phenyl)-pyrimidine, m.p. (C-Ch) 35° C., phase transition (S$_C$-Ch) 29° C., cl.p. (Ch-I) 45.5° C.;
(S)-5-(5-methylheptyl)-2-(4-[7-octenyloxy]phenyl)-pyrimidine, m.p. (C-Ch) 29° C., phase transition (S$_C$*-Ch) 27.5° C., cl.p. (Ch-I) 40° C.;
(S)-5-(5-methylheptyl)-2-(4-[10-undecenyloxy]phenyl)-pyrimidine, m.p. (C-S$_C$*) 17° C., phase transition (S$_C$*-Ch) 37° C. cl.p. (Ch-I) 47.5° C.;
(S)-5-(6-methyloctyl)-2-(4-[5-hexenyloxy]phenyl)-pyrimidine, m.p. (C-Ch) 12.5° C., cl.p. (Ch-I) 21° C.;
(S)-5-(6-methyloctyl)-2-(4-[6-heptenyloxy]phenyl)-pyrimidine, m.p. {C-S$_C$*) 6.5° C., phase transition (S$_C$*-Ch) 18.5° C., cl.p. (Ch-I) 39° C.;
(S)-5-(6-methyloctyl)-2-(4-[7-octenyloxy]phenyl)-pyrimidine, m.p. (C-S$_C$*) 4° C., phase transition (S$_C$*-Ch) 14.5° C., cl.p. (Ch-I) 32° C.;
(S)-5-(6-methyloctyl)-2-(4-[9-decenyloxy]phenyl)-pyrimidine, m.p. (C-S$_C$*) 12° C., phase transition (S$_C$*-Ch) 27° C., cl.p. (Ch-I) 37.5° C.;
(S)-5-(6-methyloctyl)-2-(4-[10-undecenyloxy]phenyl)-pyrimidine, m.p. (C-S$_C$*) 20° C., phase transition (S$_C$*-Ch) 35.5° C., cl.p. (Ch-I) 44.5° C.;
5-decyl-2-(4-[5-hexenyloxy]phenyl)pyrimidine, m.p. (C-S$_A$) 55.5° C., phase transition (S$_C$-S$_A$) 33° C., cl.p. (S$_A$-I) 62° C.;
5-decyl-2-(4-[7-octenyloxy]phenyl)pyrimidine, m.p. (C-S$_C$) 37° C., phase transition (S$_C$-S$_A$) 47° C., cl.p. (S$_A$-I) 67.5° C.;
5-decyl-2-(4-[8-nonenyloxy]phenyl)pyrimidine, m.p. (C-S$_C$) 32.5° C., phase transition (S$_C$-S$_A$) 55° C., cl.p. (S$_A$-I) 72° C.;
5-decyl-2-(4-[9-decenyloxy]phenyl)pyrimidine, m.p. (C-S$_C$) 33° C., phase transition (S$_C$-S$_A$) 57° C., cl.p. (S$_A$-I) 70° C.;
5-decyl-2-(4-[10-undecenyloxy]phenyl)pyrimidine, m.p. (C-S$_C$) 36° C., phase transition (S$_C$-S$_A$) 64.5° C., cl.p. (S$_A$-I) 72.5° C.

The optical antipodes of the optically active compounds and following compounds, including the optical antipodes of the optically active compounds, could be made in an analogous manner:
(S)-5-(5-methylheptyl)-2-(4-[8-nonenyloxy]phenyl)-pyrimidine;
(S)-5-(5-methylheptyl)-2-(4-[5Z-heptenyloxy]phenyl)-pyrimidine;
(S)-5-(5-methylheptyl)-2-(4-[5Z-octenyloxy]phenyl)-pyrimidine;
(S)-5-(5-methylheptyl)-2-(4-[5Z-nonenyloxy]phenyl)-pyrimidine;
(S)-5-(5-methylheptyl)-2-(4-[5Z-decenyloxy]phenyl)-pyrimidine;
(S)-5-(6-methyloctyl)-2-(4-[8-nonenyloxy]phenyl)-pyrimidine;
(S)-5-(6-methyloctyl)-2-(4-[5Z-octenyloxy]phenyl)-pyrimidine;
(S)-5-(6-methyloctyl)-2-(4-[5Z-nonenyloxy]phenyl)-pyrimidine;
(S)-5-(6-methyloctyl)-2-(4-[5Z-decenyloxy]phenyl)-pyrimidine;
(S)-5-(6-methyloctyl)-2-(4-[5Z-undecenyloxy]phenyl)-pyrimidine;
(S)-5-(2-methylbutyloxy)-2-(4-[7-octenyloxy]phenyl)-pyrimidine;
(S)-5-(2-methylbutyloxy)-2-(4-[8-nonenyloxy]phenyl)-pyrimidine;
(S)-5-(2-methylbutyloxy)-2-(4-[9-decenyloxy]phenyl)-pyrimidine;
(S)-5-(2-methylbutyloxy)-2-(4-[5Z-octenyloxy]phenyl)-pyrimidine;
(S)-5-(4-methylhexyloxy)-2-(4-[7-octenyloxy]phenyl)-pyrimidine;
(S)-5-(4-methylhexyloxy)-2-(4-[8-nonenyloxy]phenyl)-pyrimidine;
(S)-5-(4-methylhexyloxy)-2-(4-[9-decenyloxy]phenyl)-pyrimidine;
(S)-5-(4-methylhexyloxy)-2-(4-[5Z-octenyloxy]phenyl)-pyrimidine;
(S)-5-(6-methyloctyloxy)-2-(4-[7-octenyloxy]phenyl)-pyrimidine;
(S)-5-(6-methyloctyloxy)-2-(4-[8-nonenyloxy]phenyl)-pyrimidine;
(S)-5-(6-methyloctyloxy)-2-(4-[9-decenyloxy]phenyl)-pyrimidine;
(S)-5-(6-methyloctyloxy)-2-(4-[5Z-octenyloxy]phenyl)-pyrimidine;
(S)-5-(1-methylheptyloxy)-2-(4-[9-decenyloxy]phenyl)-pyrimidine;
(S)-5-(1-methylheptyloxy)-2-(4-[5Z-octenyloxy]-phenyl)pyrimidine;
(S)-5-(4-[2-methylbutyl]phenyl)-2-(4-[7-octenyloxy]-phenyl)pyrimidine;
(S)-5-(4-[2-methylbutyl]phenyl)-2-(4-[8-nonenyloxy]-phenyl)pyrimidine;
(S)-5-(4-[2-methylbutyl]phenyl)-2-(4-[9-decenyloxy]-phenyl)pyrimidine;
(S)-5-(4-[2-methylbutyl]phenyl)-2-(4-[5Z-octenyloxy]-phenyl)pyrimidine;
(S)-5-(4-[4-methylhexyl]phenyl)-2-(4-[7-octenyloxy]-phenyl)pyrimidine;
(S)-5-(4-[4-methylhexyl]phenyl)-2-(4-[8-nonenyloxy]-phenyl)pyrimidine;
(S)-5-(4-[4-methylhexyl]phenyl)-2-(4-[9-decenyloxy]-phenyl)pyrimidine;
(S)-5-(4-[4-methylhexyl]phenyl)-2-(4-[5Z-octenyloxy]-phenyl)pyrimidine;
(S)-5-(4-[6-methyloctyl]phenyl)-2-(4-[7-octenyloxy]-phenyl)pyrimidine;
(S)-5-(4-[6-methyloctyl]phenyl)-2-(4-[8-nonenyloxy]-phenyl)pyrimidine;
(S)-5-(4-[6-methyloctyl]phenyl)-2-(4-[9-decenyloxy]-phenyl)pyrimidine;
(S)-5-(4-[6-methyloctyl]phenyl)-2-(4-[5Z-octenyloxy]-phenyl)pyrimidine;
5-decyl-2-(4-[4-pentenyloxy]phenyl)pyrimidine;
5-dodecyl-2-(4-[4-pentenyloxy]phenyl)pyrimidine;
5-dodecyl-2-(4-[5-hexenyloxy]phenyl)pyrimidine;
5-decyl-2-(4-[6-heptenyloxy]phenyl)pyrimidine;
5-dodecyl-2-(4-[6-heptenyloxy]phenyl)pyrimidine;
5-undecyl-2-(4-[7-octenyloxy]phenyl)pyrimidine;
5-dodecyl-2-(4-[7-octenyloxy]phenyl)pyrimidine;
5-nonyl-2-(4-[8-nonenyloxy]phenyl)pyrimidine;
5-undecyl-2-(4-[8-nonenyloxy]phenyl)pyrimidine;
5-dodecyl-2-(4-[8-nonenyloxy]phenyl)pyrimidine;
5-octyl-2-(4-[9-decenyloxy]phenyl)pyrimidine;
5-nonyl-2-(4-[9-decenyloxy]phenyl)pyrimidine;
5-octyl-2-(4-[10-undecenyloxy]phenyl)pyrimidine;
5-nonyl-2-(4-[10-undecenyloxy]phenyl)pyrimidine.

EXAMPLE 4

A solution of 0.9 g of 2-(4'-hydroxy-4-biphenylyl)-5-(4-pentenyl)-m-dioxane and 1.25 g of (S)-1-bromo-4-methylhexane in 25 ml of N,N-dimethylformamide was treated with 1.2 g of finely powdered potassium carbonate and the mixture was stirred overnight in an oil bath of 60° C. The suspension was suction filtered and the filtrate was concentrated in a vacuum. A solution of the residue in diethyl ether was washed twice with water, dried over sodium sulphate and concentrated. Chromatography of the crude product on 40 g of silica gel with hexane/ethyl acetate (vol. 23:2) and two-fold recrystallization from ethyl acetate gave pure (S)-trans-2-[4'-(4-methylhexyloxy)-4-biphenylyl]-5-(4-pentenyl)-m-dioxane; phase transition (S-S) 99.5° C., phase transition (S-$S_C$*) 127° C., phase transition ($S_C$*-Ch) 130° C., cl.p. (Ch-I) 148° C.

The 2-(4'-hydroxy-4-biphenyl)-5-(4-pentenyl)-m-dioxane used as the starting material was prepared as follows:

(a) A mixture of 21.06 g of 4-biphenylyl p-tosylate in 120 ml of dichloromethane was treated at $-2°$ C. with 23.6 ml of titanium tetrachloride. 9.63 ml of (dichloromethyl) methyl ether were then added dropwise thereto at the same temperature within 30 minutes, the mixture was stirred at room temperature for 1 hour and then poured on to ice. The organic phase was separated and the aqueous phase was extracted with dichloromethane. The combined organic phases were washed with saturated sodium hydrogen carbonate solution and with water, dried over sodium sulphate and concentrated. Recrystallization of the resulting crude product from 50 ml of ethyl acetate gave 11.65 g of 4'-(p-tosyloxy)biphenyl-4-carboxaldehyde.

(b) A solution of 1.4 g of 4'-(p-tosyloxy)biphenyl-4-carboxaldehyde and 0.7 g of 2-(4-pentenyl)-1,3-propanediol in 25 ml of toluene was treated with 3 drops of 10% (vol.) sulphuric acid. The mixture was heated to boiling for 1.5 hours while stirring, with moist toluene being distilled off and being replaced by the dropwise addition of fresh toluene. Thereafter, the mixture was neutralized with 3 drops of triethylamine. After cooling the mixture was washed with semi-saturated sodium hydrogen carbonate solution and with water, dried over sodium sulphate and concentrated. The resulting crude 5-(4-pentenyl)-2-[4'-(p-tosyloxy)-4-biphenylyl]-m-dioxane (1.9 g) was dissolved in 80 ml of ethanol while warming. The solution was treated with a solution of 1.3 g of potassium hydroxide in 15 ml of water and heated to boiling for 2 hours while stirring. After cooling the mixture was neutralized (to pH 6) with 1 ml of glacial ascetic acid and concentrated. A solution of the residue in 200 ml of dichloromethane was washed twice with 50 ml of water each time, dried over sodium sulphate and concentrated. Chromatography of the residue on 40 g of silica gel with toluene/acetone (vol. 19:1) gave 0.9 g of 2-(4'-hydroxy-4-biphenylyl)-5-(4-pentenyl)-m-dioxane.

The following compounds, including the optical antipodes of the optically active compounds, could be manufactured in an analogous manner:

(S)-trans-2-[4'-(4-methylhexyloxy)-4-biphenylyl]-5-(5-hexenyl)-m-dioxane;
(S)-trans-2-[4'-(4-methylhexyloxy)-4-biphenylyl]-5-(6-heptenyl)-m-dioxane;
(S)-trans-2-[4'-(4-methylhexyloxy)-4-biphenylyl]-5-(7-octenyl)-m-dioxane;
(S)-trans-2-[4'-(4-methylhexyloxy)-4-biphenylyl]-5-(8-nonenyl)-m-dioxane;
(S)-trans-2-[4'-(4-methylhexyloxy)-4-biphenylyl]-5-(9-decenyl)-m-dioxane;
(S)-trans-2-[4'-(4-methylhexyloxy)-4-biphenylyl]-5-(10-undecenyl)-m-dioxane;
(S)-trans-2-[4'-(4-methylhexyloxy)-4-biphenylyl]-5-(6Z-nonenyl)-m-dioxane;
(S)-trans-2-[4'-(6-methyloctyloxy)-4-biphenylyl]-5-(4-pentenyl)-m-dioxane;
(S)-trans-2-[4'-(6-methyloctyloxy)-4-biphenylyl]-5-(5-hexenyl)-m-dioxane;
(S)-trans-2-[4'-(6-methyloctyloxy)-4-biphenylyl]-5-(6-heptenyl)-m-dioxane;
(S)-trans-2-[4'-(6-methyloctyloxy)-4-biphenylyl]-5-(7-octenyl)-m-dioxane;
(S)-trans-2-[4'-(6-methyloctyloxy)-4-biphenylyl]-5-(8-nonenyl)-m-dioxane;
(S)-trans-2-[4'-(6-methyloctyloxy)-4-biphenylyl]-5-(9-decenyl)-m-dioxane;
(S)-trans-2-[4'-(6-methyloctyloxy)-4-biphenylyl]-5-(10-undecenyl)-m-dioxane;
(S)-trans-2-[4'-(6-methyloctyloxy)-4-biphenylyl]-5-(6Z-nonenyl)-m-dioxane;
(S)-trans-2-[4'-(1-methylheptyloxy)-4-biphenylyl]-5-(4-pentenyl)-m-dioxane;
(S)-trans-2-[4'-(1-methylheptyloxy)-4-biphenylyl]-5-(5-hexenyl)-m-dioxane;
(S)-trans-2-[4'-(1-methylheptyloxy)-4-biphenylyl]-5-(6-heptenyl)-m-dioxane;
(S)-trans-2-[4'-(1-methylheptyloxy)-4-biphenylyl]-5-(7-octenyl)-m-dioxane;
(S)-trans-2-[4'-(1-methylheptyloxy)-4-biphenylyl]-5-(8-nonenyl)-m-dioxane;
(S)-trans-2-[4'-(1-methylheptyloxy)-4-biphenylyl]-5-(9-decenyl)-m-dioxane;
(S)-trans-2-[4'-(1-methylheptyloxy)-4-biphenylyl]-5-(10-undecenyl)-m-dioxane;
(S)-trans-2-[4'-(1-methylheptyloxy)-4-biphenylyl]-5-(6Z-nonenyl)-m-dioxane;
(S)-trans-2-[4'-(5-hexenyloxy)-4-biphenyl]-5-(4-methylhexyl)-m-dioxane;
(S)-trans-2-[4'-(6-heptenyloxy)-4-biphenyl]-5-(4-methylhexyl)-m-dioxane;
(S)-trans-2-[4'-(7-octenyloxy)-4-biphenyl]-5-(4-methylhexyl)-m-dioxane;
(S)-trans-2-[4'-(8-nonenyloxy)-4-biphenyl]-5-(4-methylhexyl)-m-dioxane;
(S)-trans-2-[4'-(9-decenyloxy)-4-biphenyl]-5-(4-methylhexyl)-m-dioxane;
(S)-trans-2-[4'-(10-undecenyloxy)-4-biphenyl]-5-(4-methylhexyl)-m-dioxane;
(S) trans-2-[4'-(5Z-octenyloxy)-4-biphenyl]-5-(4-methylhexyl)-m-dioxane;
trans-2-(4'-hexyloxy-4-biphenylyl)-5-(5-hexenyl)-m-dioxane;
trans-2-(4'-hexyloxy-4-biphenylyl)-5-(6-heptenyl)-m-dioxane;
trans-2-(4'-hexyloxy-4-biphenylyl)-5-(7-octenyl)-m-dioxane;
trans-2-(4'-hexyloxy-4-biphenylyl)-5-(8-nonenyl)-m-dioxane;
trans-2(4'-hexyloxy-4-biphenylyl)-5-(9-decenyl)-m-dioxane;
trans-2-(4'-hexyloxy-4-biphenylyl)-5-(10-undecenyl)-m-dioxane;
trans-2-(4'-octyloxy-4-biphenylyl)-5-(5-hexenyl)-m-dioxane;

trans-2-(4'-octyloxy-4-biphenylyl)-5-(6-heptenyl)-m-dioxane;
trans-2-(4'-octyloxy-4-biphenylyl)-5-(7-octenyl)-m-dioxane;
trans-2-(4'-octyloxy-4-biphenylyl)-5-(8-nonenyl)-m-dioxane;
trans-2-(4'-octyloxy-4-biphenylyl)-5-(9-decenyl)-m-dioxane;
trans-2-(4'-octyloxy-4-biphenylyl)-5-(10-undecenyl)-m-dioxane;
trans-2-[4'-(4-pentenyloxy)-4-biphenylyl]-5-octyl-m-dioxane;
trans-2-[4'-(5-hexenyloxy)-4-biphenylyl]-5-octyl-m-dioxane;
trans-2-[4'-(6-heptenyloxy)-4-biphenylyl]-5-octyl-m-dioxane;
trans-2-[4'-(7-octenyloxy)-4-biphenylyl]-5-octyl-m-dioxane:
trans-2-[4'-(8-nonenyloxy)-4-biphenylyl]-5-octyl-m-dioxane;
trans-2-[4'-(9-decenyloxy)-4-biphenylyl]-5-octyl-m-dioxane;
trans-2-[4'-(10-undecenyloxy)-4-biphenylyl]-5-octyl-m-dioxane.

Mixture Example A 30 wt. % of (S)-4-(10-undecenyloxy)benzoic acid 4-(5-[6-methyloctyl]-2-pyrimidinyl)phenyl ester,
70 wt. % of (S)-4'-(3-methylpentyl)-4-biphenylcarboxylic acid 4-(9-decenyloxy)phenyl ester;
phase transitions: (I-Ch) 137.5° C., (Ch-S$_C$*) 102° C., (S$_C$*-C or S$_C$*-S) 43° C.

Mixture Example B 30 wt. % of (S)-4'-(3-methylpentyl)-4-biphenylcarboxylic acid 4-(6-heptenyloxy)phenyl ester,
42 wt. % of (S)-5-(5-methylheptyl)-2-(4-[10-undecenyloxy]phenyl)pyrimidine,
28 wt. % of (S)-4-(9-decenyloxy)benzoic acid 4-(4-methylhexyloxy)phenyl ester;
phase transitions: (I-Ch) 72.5° C., (Ch-S$_C$*) 56° C., (S$_C$*-S) 7.5° C.

Mixture Example C 50 wt. % of 5-decyl-2-(4-[9-decenyloxy]phenyl)pyrimidine,
35 wt. % of (S)-4'-(3-methylpentyl)-4-biphenylcarboxylic acid 4-heptyloxyphenyl ester,
15 wt. % of (S)-4'-(3-methylpentyl)-4-biphenylcarboxylic acid 4-decyloxyphenyl ester;
phase transitions: (I-Ch) 101.5° C., (Ch-S$_A$) 93° C. (S$_C$-S$_A$*) 86.5° C., (S$_C$*-C) 14° C.

We claim:

1. A liquid crystalline mixture with ferroelectric properties containing at least 2 components, wherein at least one of said components is an optically active compound of the formula

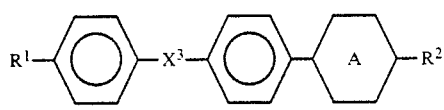

wherein
R$^1$ is straight chain alkenyl with a terminal double bond, or straight chain alkenyloxy with a terminal double bond; X$^3$ is —COO— or —OOC—; ring A is 1,4-phenylene or pyrimidin-2,5-diyl; and R$^2$ is alkyl, alkoxy, methylalkyl or methylalkoxy.

2. A liquid crystalline mixture according to claim 1, which contains at least one optically active compound of formula I in which at least one of the residues R$^1$ and R$^2$ has a chiral carbon atom.

3. A liquid crystalline mixture according to claim 2, which contains an optically active compound of formula I in which R$^2$ has a chiral carbon atom and R$^1$ signifies a non-chiral, preferably straight-chain, group.

4. A liquid crystalline mixture according to claim 1, wherein one of the groups X$^1$ and X$^2$ signifies a single covalent bond and the other signifies a single covalent bond, —COO— or —OOC—.

5. A liquid crystalline mixture according to claim 1, which at least the second component contains at least one compound selected from the group of compounds of the formulae

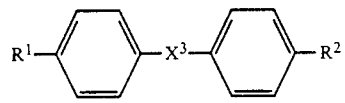

II

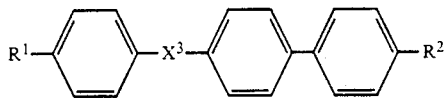

III

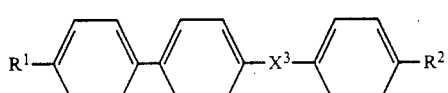

IV

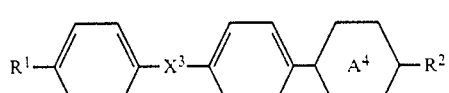

V

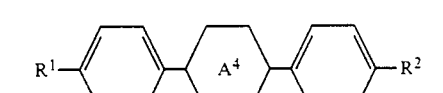

VI

VII

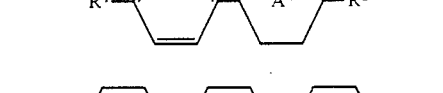

VIIIa

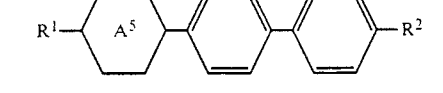

VIIIb

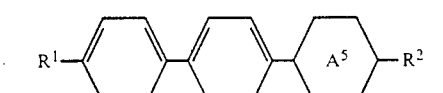

XII

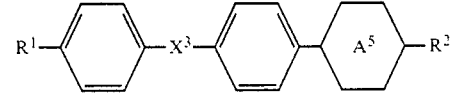

XIII

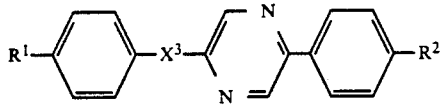 XIV wherein
X³ denotes —COO— or —OOC—, ring A⁴ represents pyrimidin-2,5-diyl, and ring A⁵ represents trans-m-dioxan-2,5-diyl.

6. A liquid crystalline mixture according to claim 1, wherein R¹ signifies alkenyl or alkenyloxy.

7. A liquid crystalline mixture according to claim 1, wherein R² signifies straight-chain alkyl or alkoxy or chiral methylalkyl or methylalkoxy.

8. A liquid crystalline mixture according to claim 1, wherein R¹ has at least 2, preferably at least 4, chain atoms between the double bond and ring A¹.

9. An electro-optical indicating device comprising a liquid crystal mixture with ferroelectric properties, wherein the mixture comprises at least two components, the liquid crystal mixture being sandwiched between two transparent plates having polarizers and electrode means, wherein at least one of said at least two components being a compound of the formula

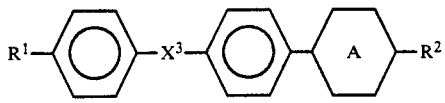

wherein
R¹ is straight chain alkenyl with a terminal double bond, or straight chain alkenyloxy with a terminal double bond; X³ is —COO— or —OOC—; ring A is 1,4-phenylene or pyrimidin-2,5-diyl; and R² is alkyl, alkoxy, methylalkyl or methylalkoxy.

* * * * *